Jan. 21, 1936.  F. V. ELBERTZ  2,028,148
ARCUATE PITCH CONE GEARING
Filed Jan. 16, 1934   17 Sheets-Sheet 1

Inventor
FRANK V. ELBERTZ
By Barthel & Barthel
Attorney

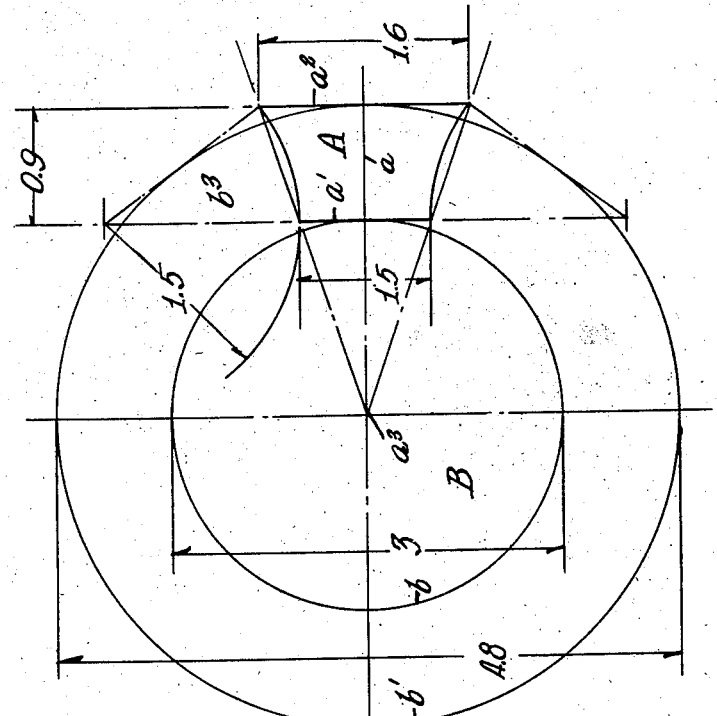
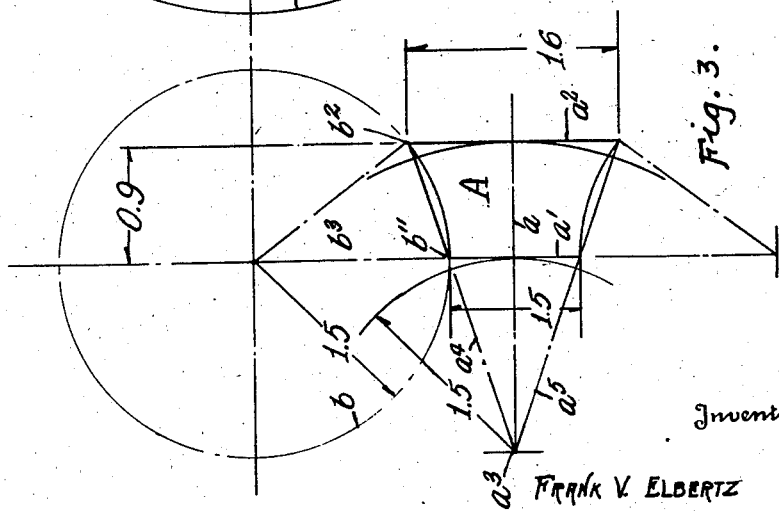

Inventor
FRANK V. ELBERTZ
By Barthel & Barthel
Attorney

Jan. 21, 1936.  F. V. ELBERTZ  2,028,148
ARCUATE PITCH CONE GEARING
Filed Jan. 16, 1934   17 Sheets-Sheet 4

Inventor
FRANK V. ELBERTZ
By Barthel & Barthel
Attorney

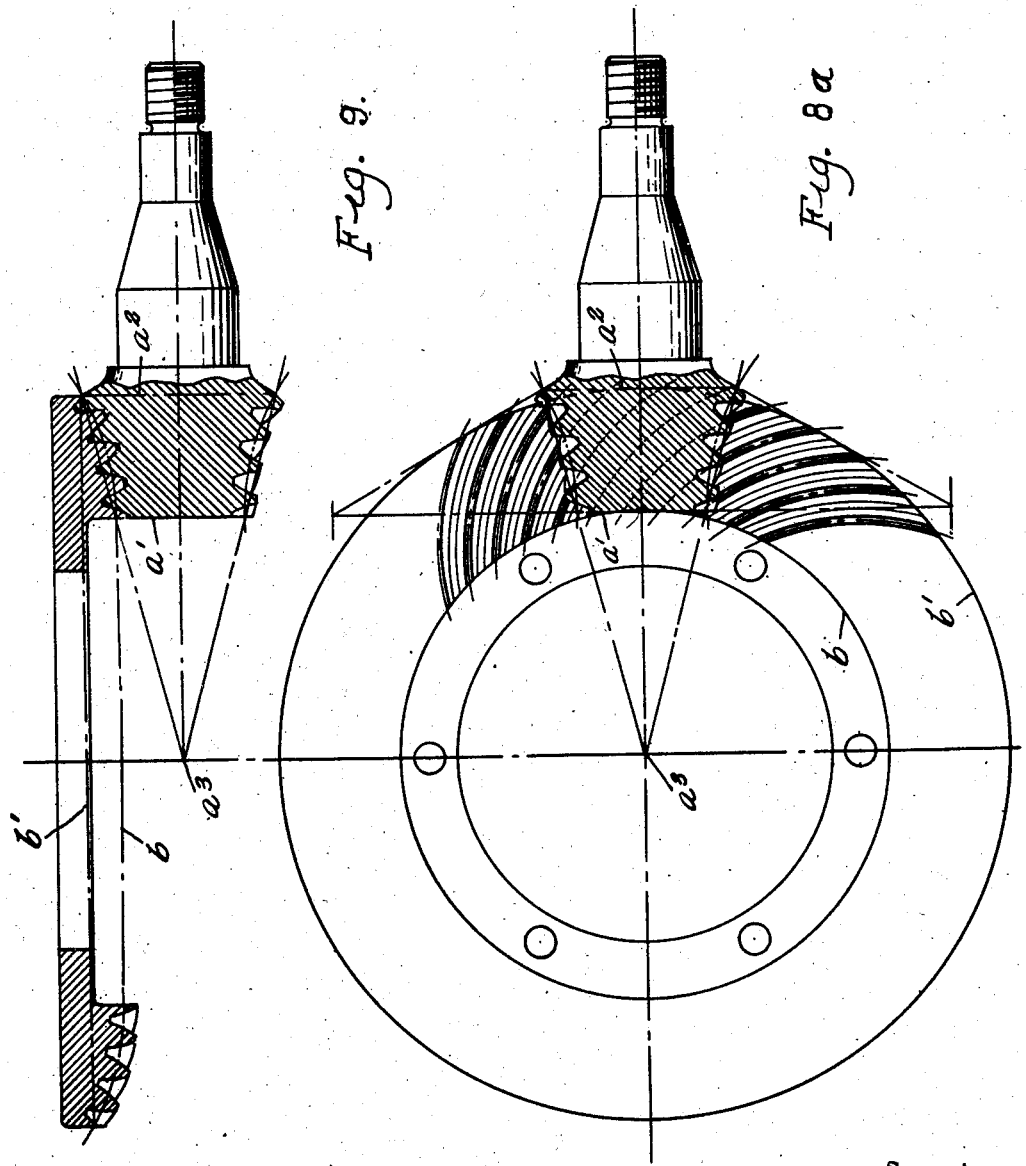

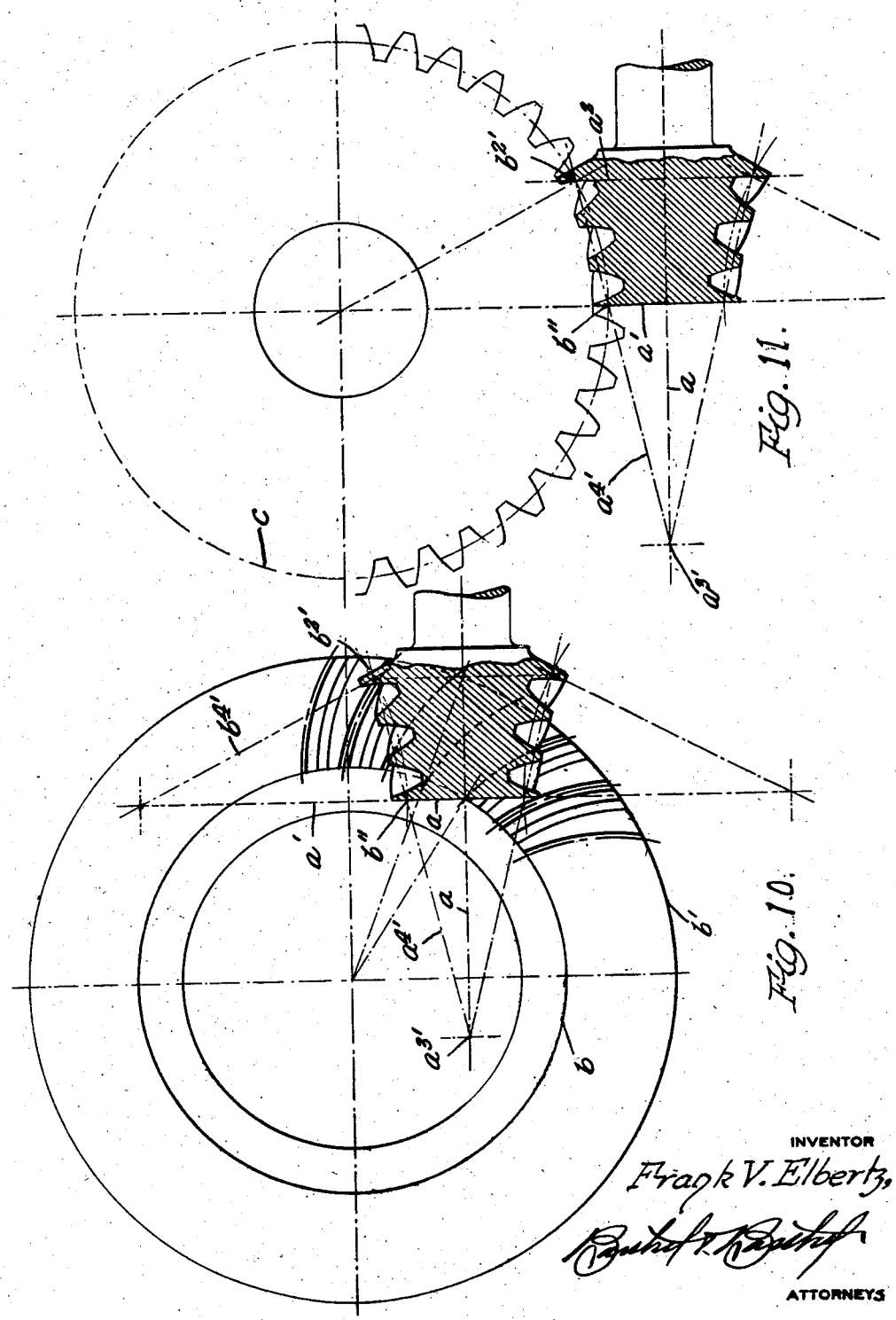

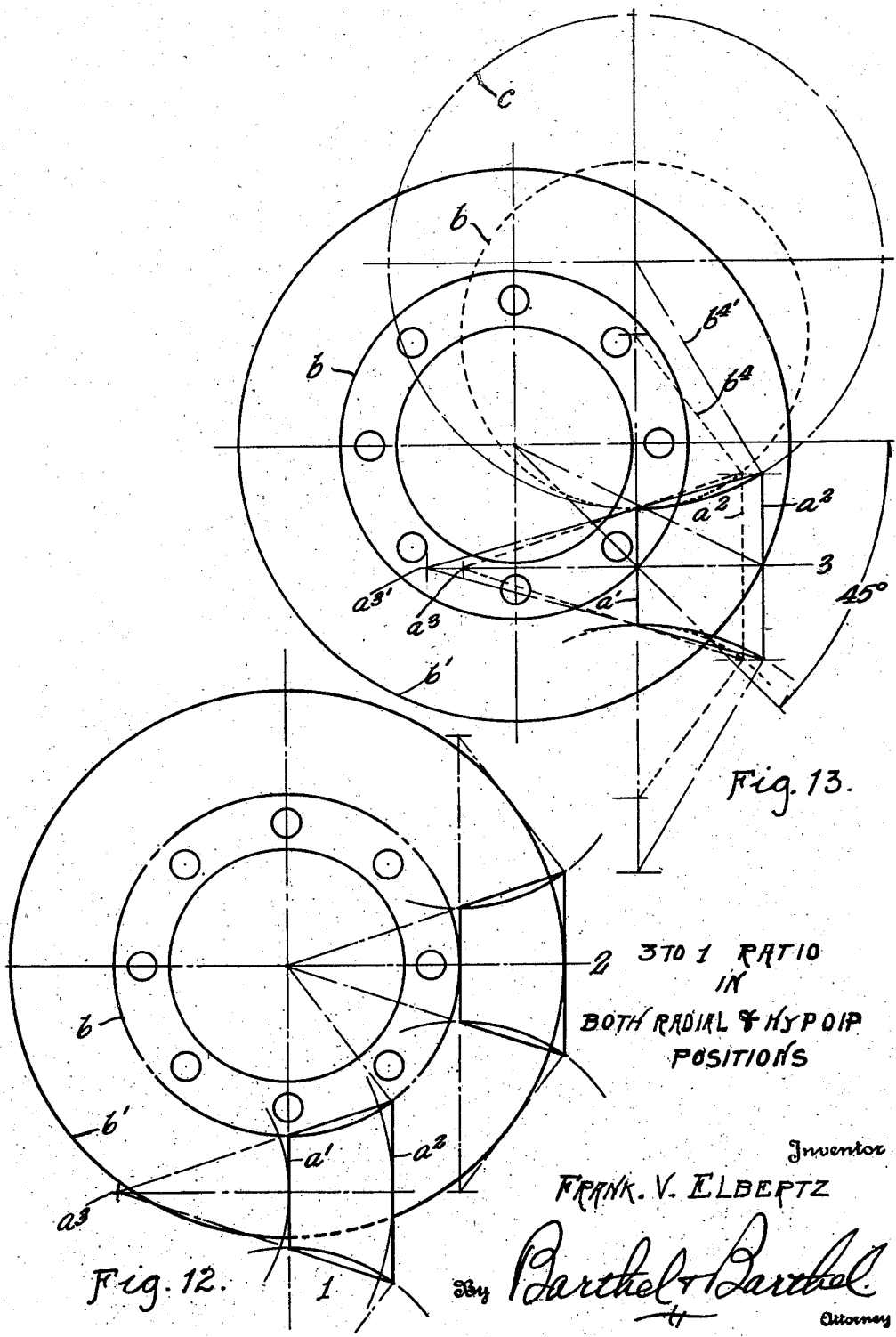
Jan. 21, 1936. F. V. ELBERTZ 2,028,148
ARCUATE PITCH CONE GEARING
Filed Jan. 16, 1934 17 Sheets-Sheet 7

Inventor
FRANK V. ELBERTZ
By Barthel & Barthel
Attorney

Inventor
FRANK V. ELBERTZ

Frank V. Elbertz
INVENTOR.

Jan. 21, 1936.  F. V. ELBERTZ  2,028,148
ARCUATE PITCH CONE GEARING
Filed Jan. 16, 1934   17 Sheets-Sheet 13

Inventor
Frank V. Elbertz
By Barthel & Barthel
Attorneys

Jan. 21, 1936.  F. V. ELBERTZ  2,028,148
ARCUATE PITCH CONE GEARING
Filed Jan. 16, 1934   17 Sheets-Sheet 16

Inventor
FRANK V. ELBERTZ
By Barthel & Barthel
Attorney

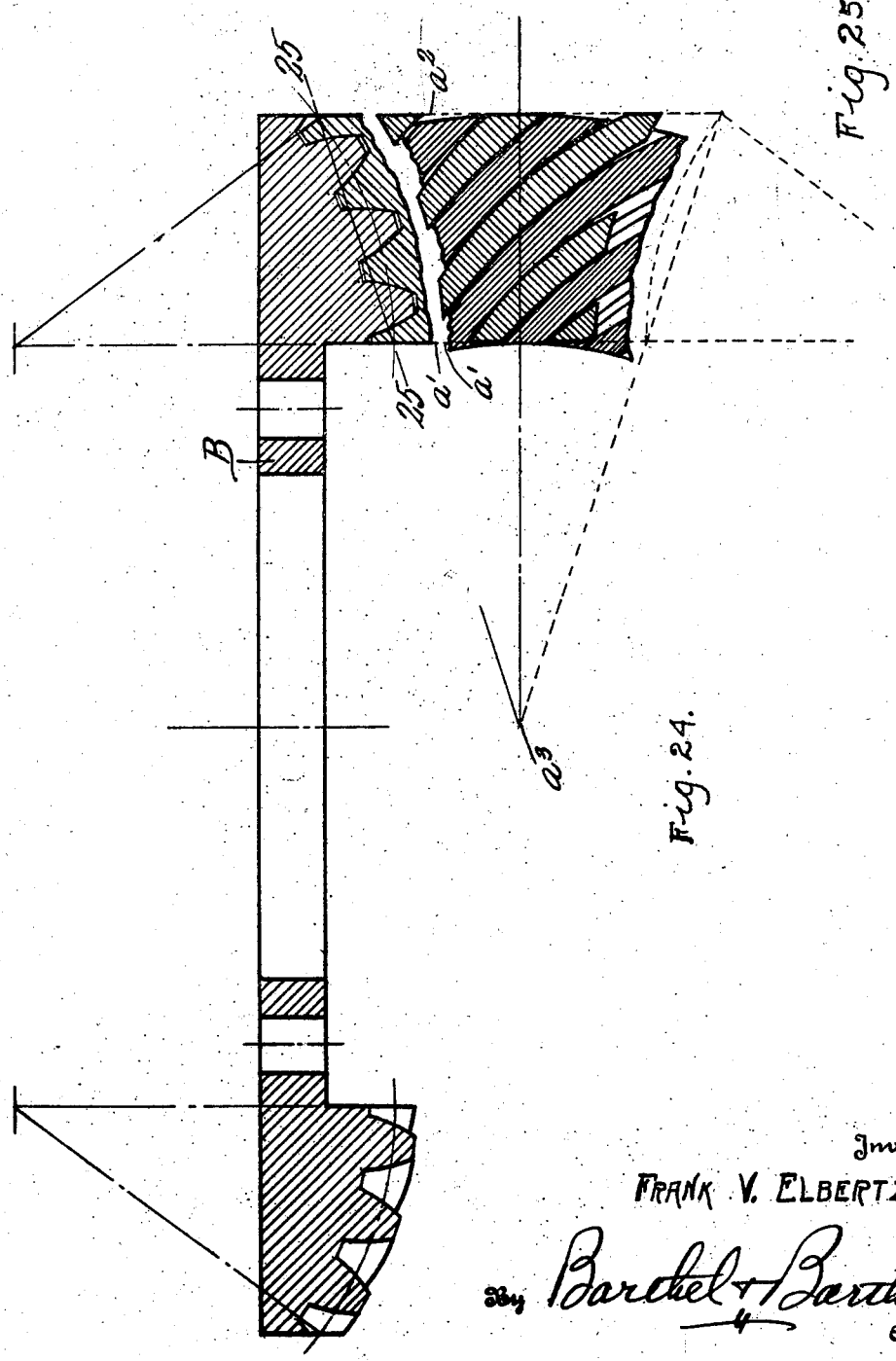

UNITED STATES PATENT OFFICE 2,028,148

ARCUATE PITCH CONE GEARING

Frank V. Elbertz, Lake Orion, Mich.

Application January 16, 1934, Serial No. 706,882

21 Claims. (Cl. 74—459.5)

This invention relates to improvements in gearing, pertaining more particularly to gearing in which two rotatable elements are geared together to set up a drive and driven relation by the use of threads or teeth or a combination thereof.

The general class of gearing referred to may be exemplified by spur gearing, bevel gearing, spiral gearing, worm gearing, etc., these being well-known forms which are expressive of the general class. Each form has its individual characteristics, including advantages and disadvantages, so that when the designer of an article of manufacture or machine desires to secure specific results, his selection of form of gearing is generally determined by some of these characteristics, so as to utilize the form best suited for the particular service. Generally these forms have the elements specifically complemental relative to each other and because of this they are generally considered as individual to themselves. Each has its limitations as to service, since the assembly of elements is such as to set up certain conditions which limit their service; bevel gearing, for instance, has its structural and assemblage characteristics such that it may not be applicable for use in place of spur gearing, due to the conditions of the installation, etc. In other words, the individuality of the types themselves tends to restrict the field of use to conditions which are most favorable to the types.

As indicated, the types differ in characteristics. As a result, one type may possess advantages over another with respect to one characteristic common to the two types but be disadvantageous with respect to a different characteristic of the two, and hence selection of type for a particular service is generally on the basis of the work to be performed and the selection of type based on the ability of the selected type to most efficiently serve the desired purpose.

Many characteristics are common in the several types, but a characteristic may differ very materially in action or result in the different types. For instance, one of these characteristics is that of tooth pressure. One type may limit the number of teeth concurrently active, so that the power application may be limited to but a single tooth, in which case the tooth must be capable of taking care of this condition and the tooth pressure is relatively high; another type may present more teeth in drive contact, thereby tending to distribute the power application, and thus reduce the tooth pressure condition. Or the form of the pressure contact on the tooth may vary as between types—the structural characteristics differ in such way that the active tooth zones produce different effects in the types.

Another characteristic in this connection is quietness in operation. With the tooth pressure relatively high, the tooth may deflect during the work period and return when freed from pressure. Aside from the effect produced on the tooth itself, the action tends to affect the quietness with which the assemblage operates.

Many other characteristics, common in the types, can be considered, being well-known to those familiar with gearing, but, as indicated above, these characteristics when compared as between types, provide variations, so that the types themselves, although members of the same general class, are more or less individual to themselves.

It is to this general condition that the present invention pertains—a condition in which the selection of a particular gear assemblage is made not simply on the conditions of the assembly within which it is to be used, but also on the ability of a particular gear assembly to meet the conditions of the service. Instead of basing the selection upon the individuality of the type, the invention contemplates a gearing assembly in which many of the characteristics presented by different forms of gearing become similar in general nature and thus enable the selection of form to be based mainly on the conditions of the assembly in which the gearing is to be used, the latter determining which of the forms is more favorable in meeting the installation conditions—with the action characteristics of general similarity in each of the forms, the question of selection becomes more or less a matter of a choice determined by the setting rather than that of the gearing assembly itself. In other words, the individuality of types, as such, becomes secondary, since the former differences in the characteristic activities are eliminated to a great degree, so that the previous type distinction loses its normal significance, and in place of the distinctive type characterization these become merged to a great extent into a single broad type that is practically co-extensive with the class itself.

This has been made possible by the development of an element which serves as one of the members of the gearing assembly. While the element differs in details when the assembly changes its type, the general characteristics of the element are similar in each of the forms so that the element tends to merge the individual types into a broad type with the previous type general distinctions becoming of the nature of groups of such type. For instance, the element is operative with the edge teeth of a wheel—a spur gear—and thus function along the lines of the worm and worm gear type; it is also operative with a wheel in which the teeth are on the side of the wheel—thus setting up the conditions of the bevel gear type as well as the crown and spiral gear type. Additionally to this, the element is not only operative with these individually but also collectively—a wheel having the teeth on the side and a wheel having its teeth on the peripheral edge can be operative concurrently with the element, permitting drive relation to be set up between two individual rotatable elements and the single rotating element, thus combining the two types into a single assembly, although each retains its individuality in the assembly.

In addition to the above, the element is not limited in position to the positions of the different types referred to. For instance, in the bevel gear type, the arrangement is such that the axes of the two elements have an intersecting characteristic. With the present invention, such intersection is not required, the element being operative in what are known as hypoid positions, with the range equal to that of a right angle—the maximum possible range. And while the general type of bevel gearing has the axes of its elements extending at right angles, the element of the present invention permits such angles to be varied from such right angular relation.

These various relationships in the gearing assembly are presented to indicate the merging characteristics of types set up by the use of the present invention. As a result, the present invention can be considered as that of a distinct type—because of the ability to bridge known types so that the form of the structure used with the element simply serves to determine the specific grouping of the assembly within the type.

The element referred to varies in certain respects when used in different groupings, but the variations are all made in accordance with certain definite characteristics, so that it is possible to readily design the elements for each of these conditions, with the result that the designer, knowing the conditions he is required to meet, can readily determine the specific form the element will take in his selection of the group and the factors on which the assembly is to meet as to drive ratio, dimensions, shaft positions, etc.

In other words, the individuality of co-operating elements presented by the present types is changed by the provision of an element capable of use as one of the elements of any of the types and thus common in all of the types, making possible the assemblage of elements of more than one type in the same gearing assembly, thus distinguishing from the present type forms. While it is possible to group a plurality of spur pinions with a single spur gear, or a member of bevel pinions with a single bevel gear, under present practice, this is primarily a matter of simple duplication; on the contrary, the present invention contemplates an assembly for instance of a companion element having its teeth at the side of the wheel—as in a bevel gearing—and a second companion element having peripheral teeth—as a worm gear—both operating concurrently with the gear which forms the foundation of the present invention and of the distinctive broad type which is set up through its use.

From this it is possible to understand the general nature of the objects of the present invention—while its dominating element is a specific structure, that structure is of such character as to serve as a connecting link to break down the distinctive nature of the structures of the present types and to provide a greater uniformity in characteristics as between the types, it being readily understood that with an element that is practically common in each of the types, the characteristics of that element are carried in a generally similar manner to each of the types, doing this without affecting the general characteristics found in an individual type but, at the same time, generally enhancing the value of the assembly of that type in meeting the particular service conditions.

Other general objects can be considered as improved service conditions—the dominating element enhances the service conditions as compared with those of the prior type presenting the most favorable conditions, and carries these into the remaining prior types. Since one of the elements of the gearing assembly is of generally similar structural character in each of the groups of the type, the machinery used in the production of the gearing need generally relate mainly to the production of the companion element as to its individual characteristics, so that diversity of required machinery is reduced, thus simplifying the production of the types. Another advantageous feature in this connection is found in the question of costs; because of the favorable conditions set up by the use of the element, the requirements as to materials used and their treatment is made less severe, so that the cost of an assembly, in this respect, can be materially reduced—a condition which also extends into the question of lubrication, it being possible to utilize lubricants of less expensive characteristic.

While the present invention has the conditions above indicated, these become of greater advantage and are due to the presence of certain characteristic features within the common element referred to and which are such as to cause the gearing thus produced to be generally superior in action to gearing of a prior type for which the new assembly is to provide the substitute. One of these characteristics is that of tooth pressure. In the present development the assembly, however provided, presents the conditions of a plurality of teeth in contact on the line of drive action, with the contact characteristics substantially similar with each of such teeth. Hence, it can be understood that the tooth pressure characteristic is not only made comparatively low, as respects each tooth, but becomes distributed in substantially equal increments among the teeth on such line of action.

For instance, in straight tooth bevel gearing the teeth so engage that perfect engagement is limited to less than two teeth with partial engagement with the adjacent teeth; as a result, uniformity of pressure conditions is seldom, if ever, obtainable. With a similar assembly of the present type, and with the elements arranged with intersecting axes, the arrangement provides for as many as four teeth of each element in engagement on the line of drive activity, with the tooth engagement substantially similar with each tooth. Obviously, the tooth pressure conditions are greatly enhanced under the present type, so that not only operation conditions become improved—the lower tooth pressure value per tooth enables the solving of lubrication problems to be greatly simplified.

These conditions are made manifest to a greater degree when considering an assembly of the hypoid characteristic. This is a special type of gearing and under prior practices the gearing has the characteristic that the greater the distance of the pinion element from its normal radial position the less becomes the effective tooth engagement on the line of drive activity; where the distance approaches the maximum the engagement may be limited to a single tooth, thus placing the entire drive pressure on that tooth and setting up conditions under which lubrication becomes a problem of major importance in order that the gearing may operate efficiently for any extended period of time. With the present invention, these conditions are practically reversed; the greater the distance from the radial position the greater becomes the amount of tooth engagement on such line of activity with a consequent reduction in tooth pressure per tooth, thus simplifying the problems of lubrication. For example, if the line of activity of the gearing having intersecting axes presents four teeth of each element in engagement, the assembly changed to present the maximum hypoid relation may present a line of activity with six teeth of each element in tooth engagement, with the engagement substantially similar with each tooth. Intermediate hypoid positions would present the number of teeth on such line of activity as between these extremes, thus indicating that as the conditions become more severe under prior practices, the same progression tends to decrease the severity when the present type is used. Under such conditions the problems of lubrication become somewhat secondary.

For similar reasons the characteristic of quietness in operation is enhanced. With lower tooth pressure conditions, deflection of teeth becomes less dominant and, in fact, may be practically eliminated. In addition, the pressure is less effective on the tooth oil film so that the lubricant is not required to sustain the severer pressures. Obviously, the larger number of teeth in contact on the line of drive activity sets up a stabilizing effect tending to quietness in operation.

These conditions are present with assemblies of each of the different groups which may be fashioned under this distinctive type, so that, aside from the vast advantage provided by the presence of an element that is, for practical consideration, substantially standard in all of the groups and the characteristics of which are controlling in the production of the assembly, the assembly, when produced, is itself superior in its important service characteristics to an assembly of the type for which it is being substituted.

The above brief statement of the nature of the present invention, while indicating the marked advantage and superiority of this distinctive type over the prior types, does not complete the picture of the serviceability of this type, due to the fact that through the present development it is possible to reach to gearing assemblages of this class which have heretofore remained alien to the class itself excepting possibly by the construction of a specific hybrid nature. For instance, it is possible to vary the angularity of the axes of two assembled elements. The normal relation of such axes in bevel gearing, for instance, presents the general angularity of shafts as that of a right angle. In the present invention this angularity can be reduced, and in the reduction the shape of the companion element becomes changed in contour. This reduction can continue until the shape of the companion element approximates that of the zone of a sphere, the invention contemplating a condition of development such that the companion element takes on characteristics of a sphere in drive and driven relation to the element by tooth or thread engagement, with the plurality of teeth in contact and the substantially equal tooth pressure conditions heretofore referred to as one of the dominant characteristics of the type.

To these and other ends, the nature of which will be more particularly set forth as the invention is hereinafter disclosed, the invention consists in the improved constructions and combinations of structures and structural characteristics described in greater detail hereinafter, illustrated in the accompanying drawings, and more particularly pointed out in the appended claims.

In the accompanying drawings, in which similar reference characters indicate similar parts in each of the views,—

Figures 3 and 4 are similar views of development, the ratio being that of three-to-one.

Figure 7 is a section of the completed element of Figure 3 positioned with respect to its generating circle, with the latter having the tooth configuration employed with the element and which may present the characteristics of a worm gear on the mid-plane of the latter.

Figures 8 and 8a are similar views of the element of Figure 7 applied in the radial position of a companion element in an assembly having bevel gearing characteristics.

Figure 9 is a sectional view of the assembly of Figure 8a, the section being on the horizontal diameter of the companion element.

Figure 10 is a view partly in section and partly in elevation of an assembly of the type of Figure 8 with the cone gear positioned in a hypoid position of thirty degrees.

Figure 11 is a view of the cone gear of Figure 10 in position relative to its generating circle.

Figures 12 and 13 are, respectively, diagrammatic views indicating development states which may be employed in developing an embryo element for use in a hypoid position of forty-five degrees.

Figure 16:
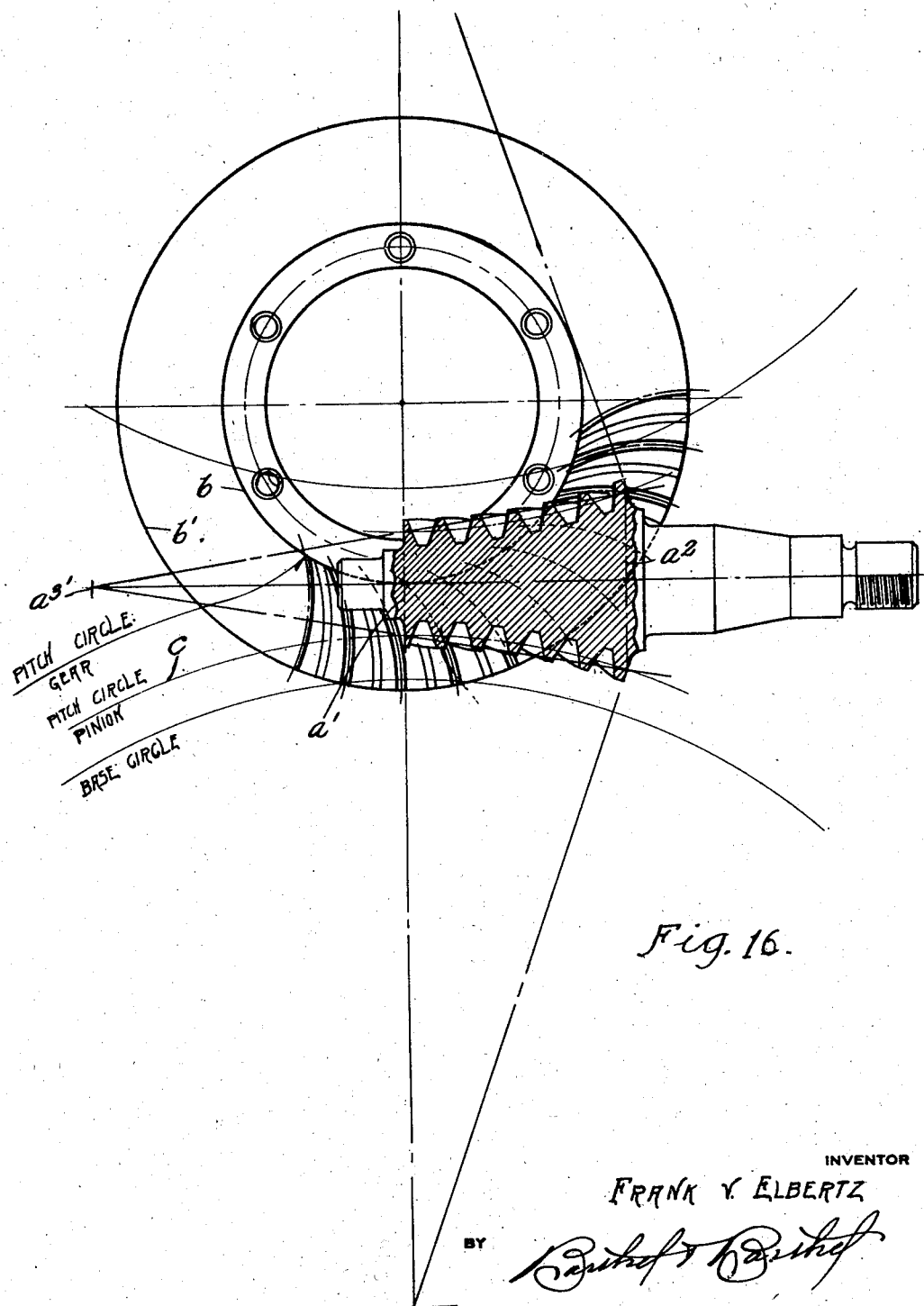

Figure 16 presents an assembly of cone gear and companion element with the cone gear in a hypoid position of ninety degrees.

Figure 17:
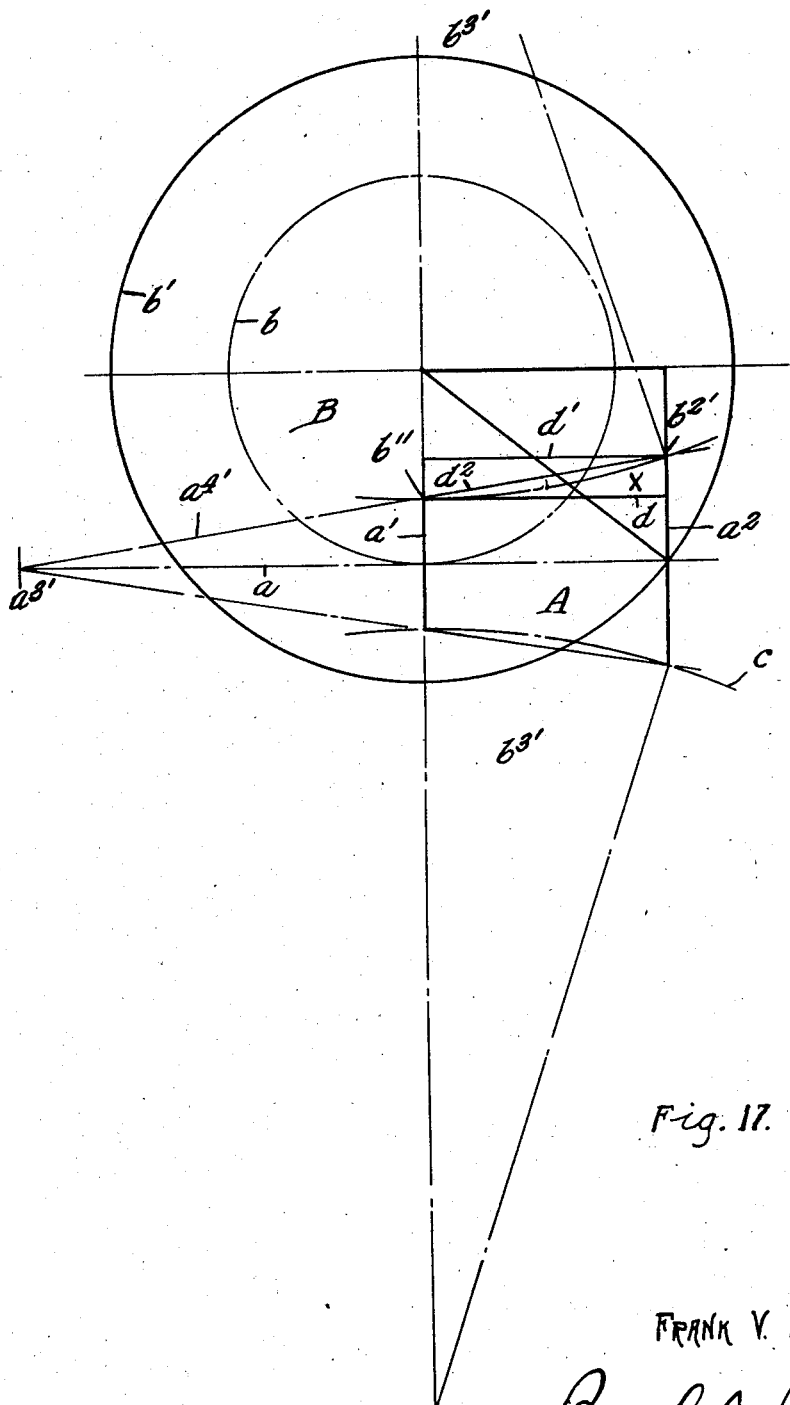

Figure 17 is a diagrammatic view showing development characteristics of the embryo element from which the cone gear of Figure 16 is produced.

Figure 18:
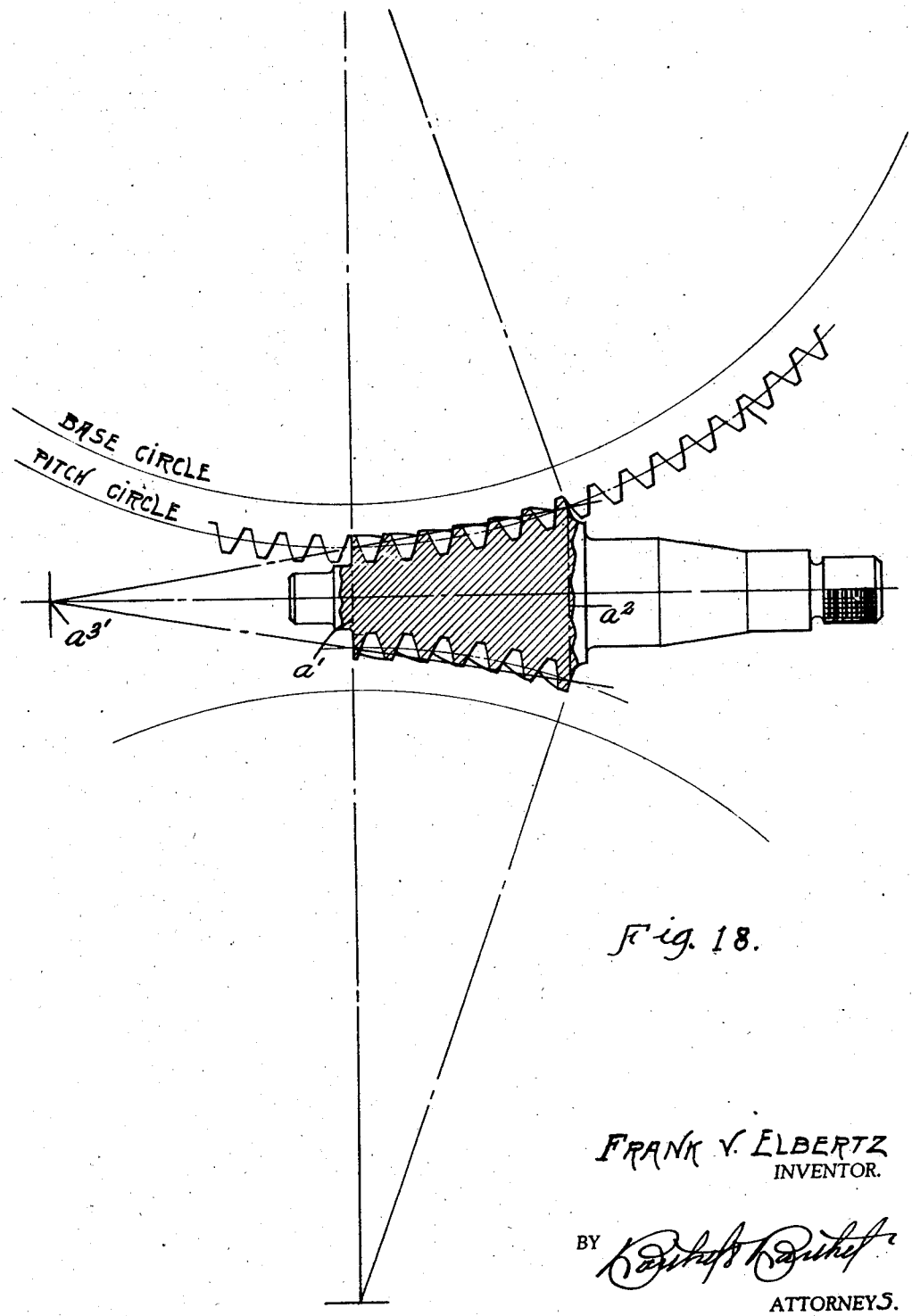

Figure 18 shows the cone gear of Figure 16 in position relative to its generating circle.

Figure 19:
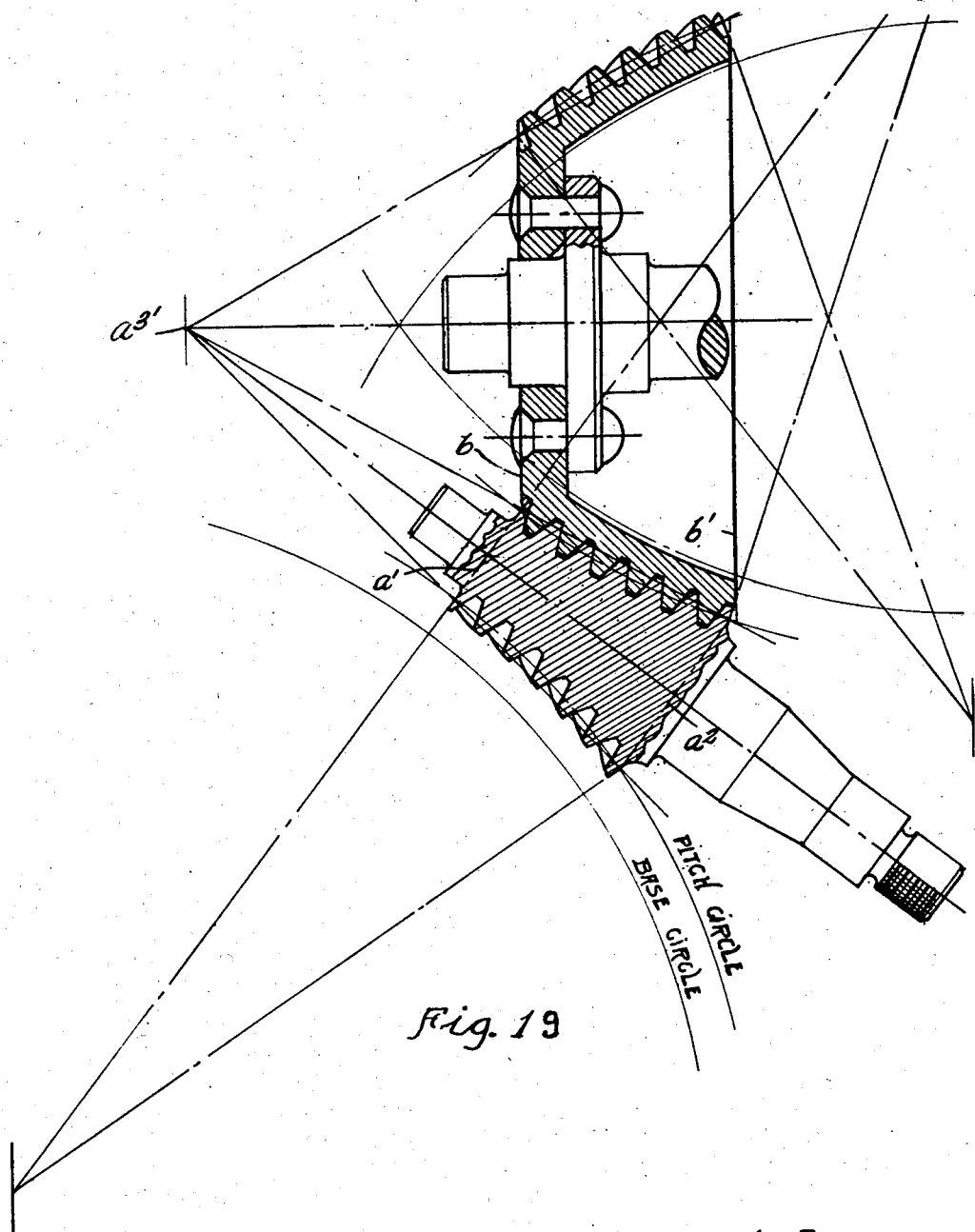

Figure 19 is a sectional view taken on a diameter of the companion element and in which the cone gear of Figure 16 is shown as having been shifted to a radial position of the companion element coincident with the line of section of the latter, the change in location of the cone gear changing the angularity of the cone gear axis relative to a plane taken lengthwise of the axis of the companion element.

Figure 20:
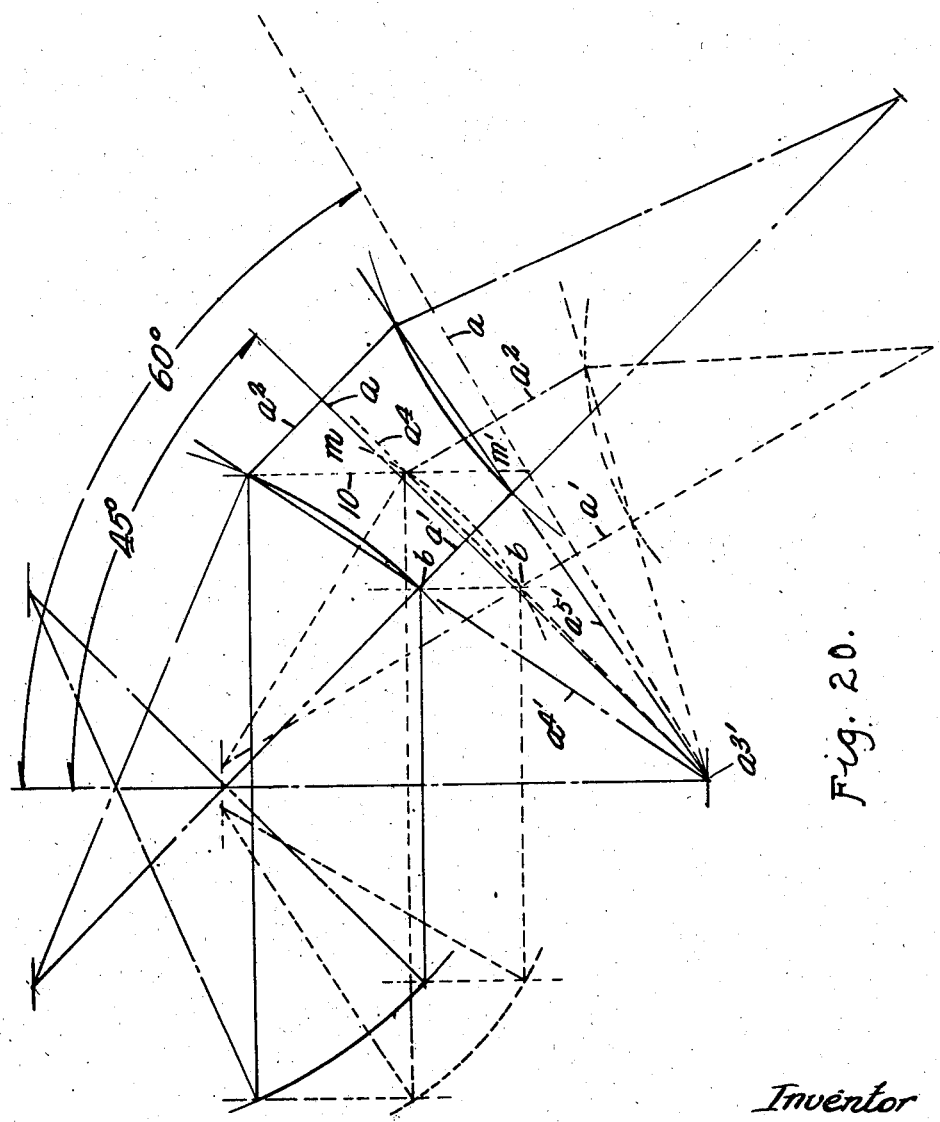

Figure 20 is a diagrammatic view illustrating development characteristics of the respective embryo cone gears for different degrees of angularity shift.

Figure 21:
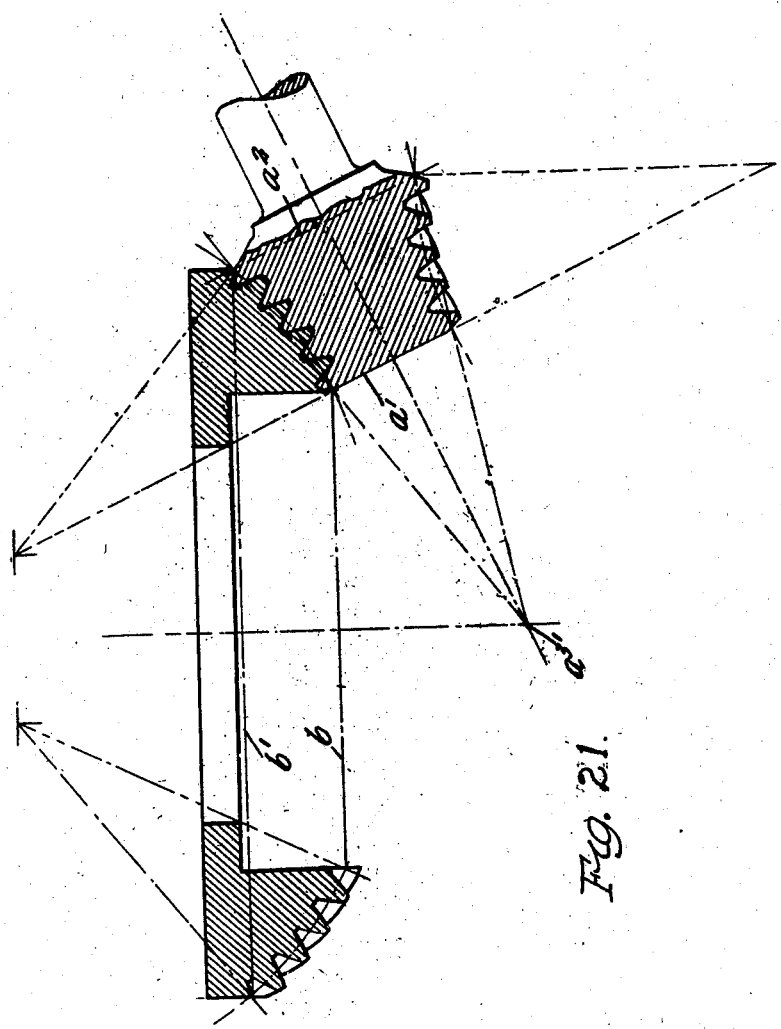

Figure 21 is a sectional view taken on a diameter of the companion element in which the angularity of axes is based on a forty-five degree hypoid position.

Figure 22:
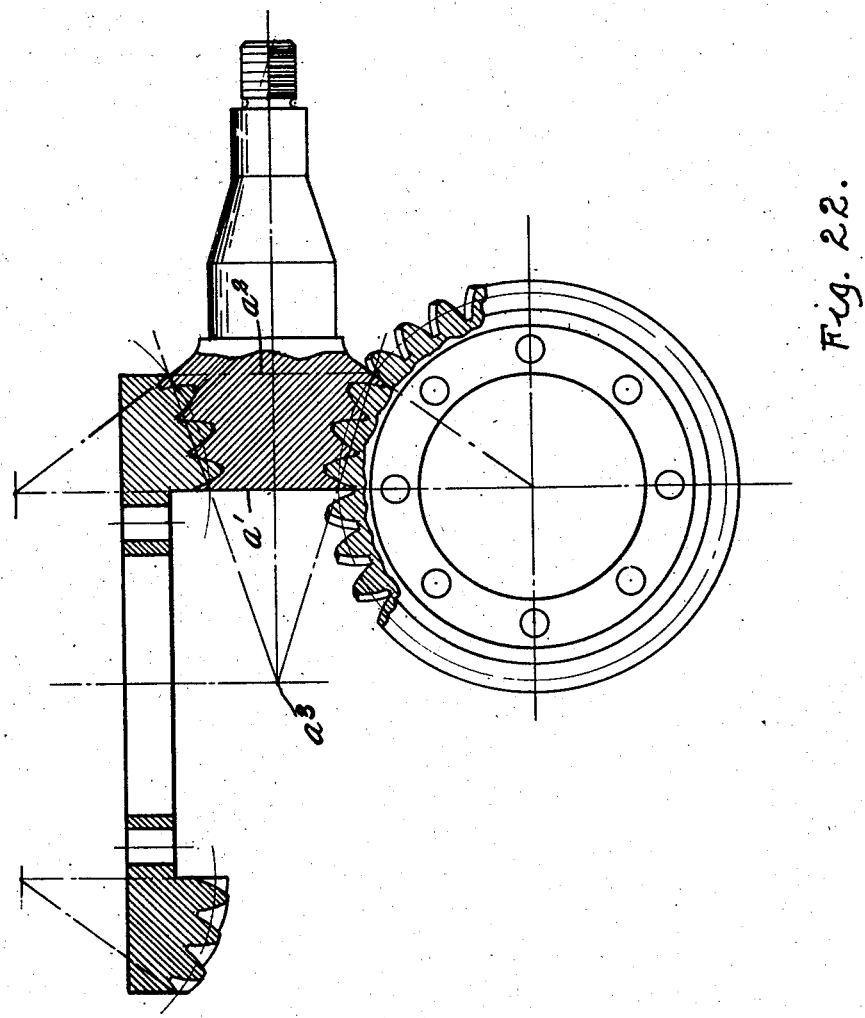

Figure 22 is a view partly in elevation and partly in section, showing an assembly of the cone gear with a companion member to set up the relationships of the bevel gear type concurrently with an assembly of the cone gear with a worm gear, a single cone gear being used for that element in both assemblies to provide a complete assembly of three elements.

Figure 23:
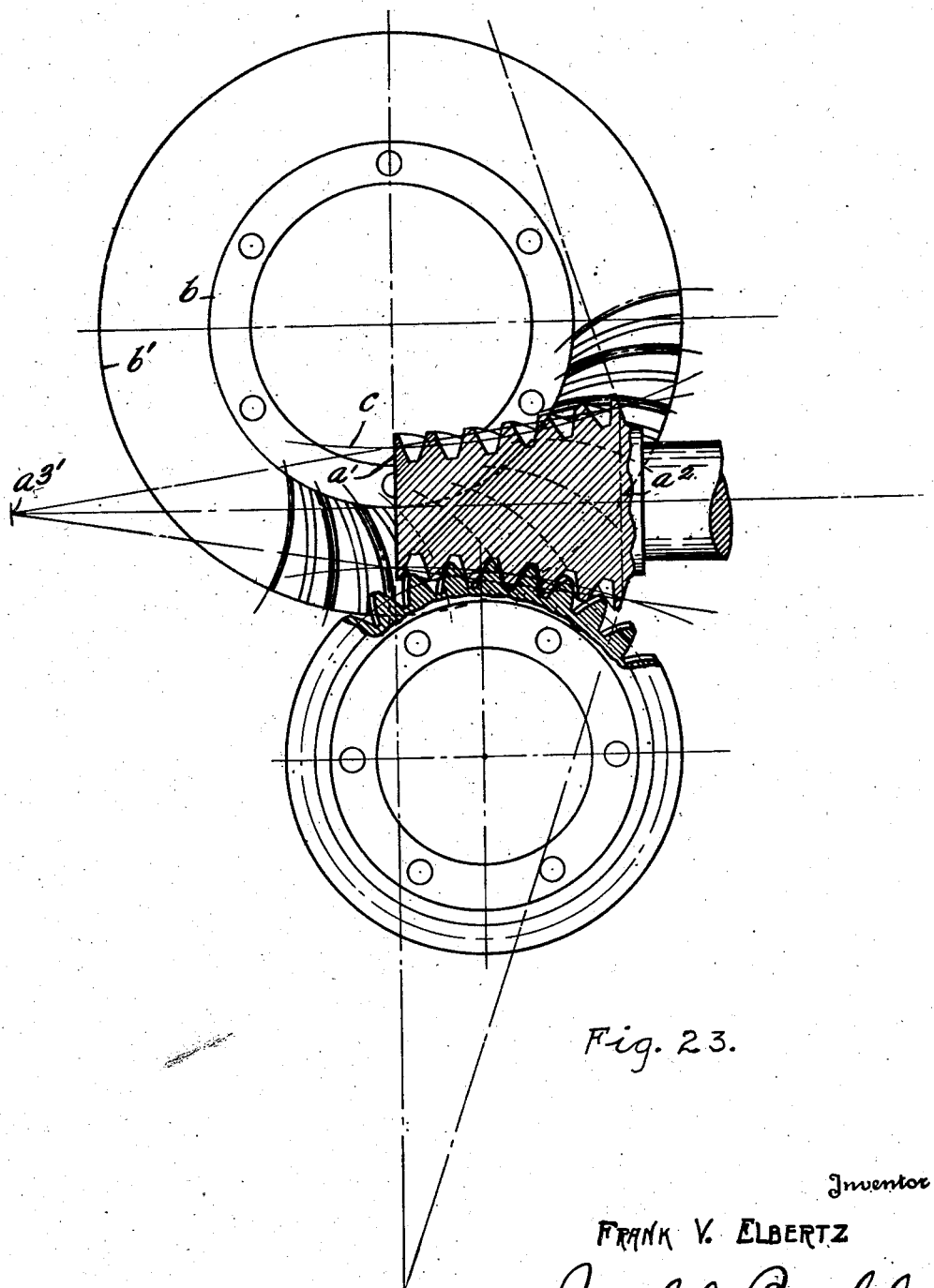

Figure 23 is a similar view showing the cone gear in its maximum hypoid position with the worm gear in differential relation to the cone gear.

Figure 24 is a sectional view taken on a diameter of the companion element used in developing the bevel gear characteristic, a portion of the cone gear being shown in position relative to the tooth zone of the companion element.

Figure 25 is a fragmentary sectional view taken on line 25—25 of Figure 24.

The element which forms the foundation of the distinctive type of gearing above referred to has somewhat of the appearance and characteristics of either end of a worm of the hour-glass type—as though such worm be divided at its longitudinal center and either end be used. Like the worm the teeth are in the form of threads which serve as teeth in providing the drive relation between it and the companion element. Because of this condition of general appearance and characteristics, the element can be termed an "arcuate pitch cone gear" and the type of gearing carry as its descriptive term, the term "arcuate pitch cone gearing." Because of this worm characteristic it is not difficult to understand that if the companion element be in the form of a worm gear properly co-related with it, the assembly would be operative as a worm and worm gear assembly. However, the element which will be termed the "cone gear" in the following descriptions, carries certain characteristics individual to itself, so that the assembly would differ somewhat from the general worm and worm gear type, these characteristics being carried into the latter type with the effect of not only increasing the efficiency of the assembly, but enables the element to be developed along a general standard empirical form so as to permit its use as the foundation of the distinctive type of gearing of the present invention.

As indicated, its use as a substitute for the worm of a worm and worm gear assembly would be more or less expected from the general similarity to worm structures, so that a detail explanation based on the conditions of such an assembly would not present the detail characteristics of the problems and their solutions which form the basis of the development of the cone gear. Hence, for the purpose of presenting a clearer explanation of the characteristic development of the invention, the initial discussion will consider the use of the cone gear as one of the elements of an assembly designed as a substitute for the prior type of straight-tooth bevel gearing. Because of the cone gear formation, certain inherent conditions are present in such service, and these can form the basis on which to develop the explanation.

Figure 2:
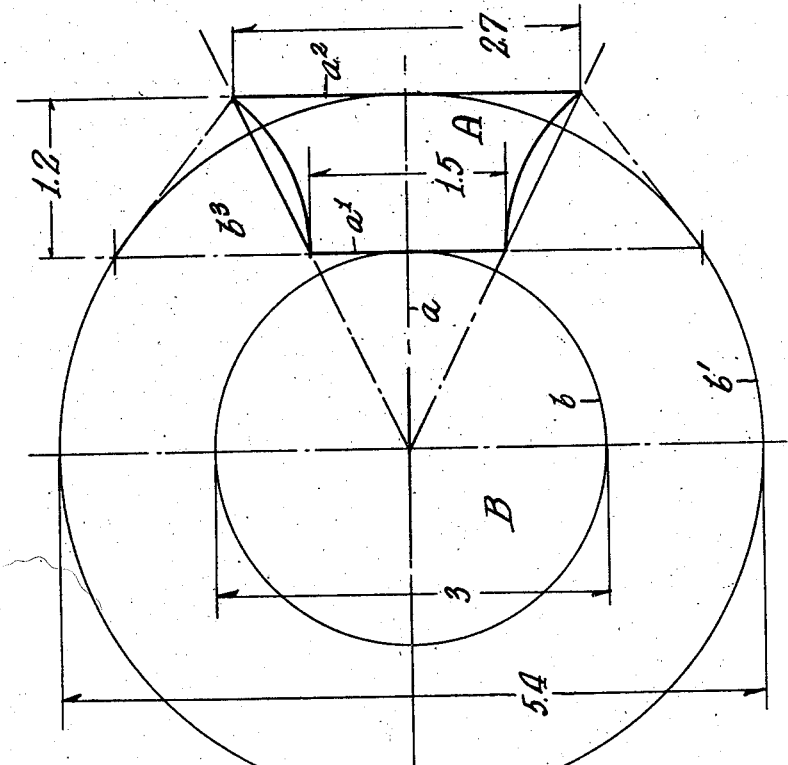
Figures 1 and 2 are diagrammatic views indicating the development of an embryo element of two-to-one ratio for use in radial position of an assembly having the bevel gear characteristic.

Some of the difficulties and problems can be understood from a reference to Figure 2, which discloses the cone gear without its threads (an embryo cone gear) as in the position of the bevel pinion of a bevel gear assembly in which the axes of the elements intersect, the cone gear being indicated at A and the complemental member at B, it being assumed that the working face of the latter would have the face of its tooth zone shaped complemental to that of the cone gear on the plane of the axis $a$, this being the point where the two elements would meet and provide the drive relation. As will be understood, opposing the faces of the assembly shown would set up the conditions of a frictional drive instead of tooth drive. Each of the elements are assumed to be rotatable on its individual axis, and the circles $b$ and $b'$ represent the inner and outer limits of the contact face of the companion element B.

As will be understood, the peripheral speed at $b$ is less than that at $b'$, since these circles have different radii; hence, if the two faces are to have proper drive action, without slippage on the circles $b$ and $b'$, the same relative speeds should be found at the ends $a'$ and $a2$ of element A; this can be provided by similarity in ratio of the diameters at the respective points—the same ratio between $b'$ and $a2$ as is present between $b$ and $a'$—so that the same speed variation is found between the opposite ends of the contact zone. Obviously, the speeds at different radial positions intermediate circles $b$ and $b'$ of element B will also vary relative to those of the circles and to each other, due to the differences in diameter, and if element A had proportionate diameter differences to correspond to the positions the entire length of contact would have this co-relation of speeds and no slippage would be present; frictional bevel gearing presents this characteristic, since the pinion face is properly proportioned relative to the opposing face throughout the axial length of the pinion face.

However, with the arcuate form of the element A indicated, it becomes clear that this regularity in proportionate increase in diameter present with the bevel pinion, is absent, although the proportionate increase in speed of the intermediate portions of the contact face of element B remains. As a result, the assembly, although having the proper speed relationships at the ends of element A necessarily presents the conditions of slippage between the two faces at points intermediate the ends, assuming the opposing contact faces are complemental on the line of contact. This slippage is possible with elements operating on frictional contact alone, but becomes of problem condition when the attempt is made to substitute tooth drive for the friction drive, since the tooth contact does not permit this freedom of slippage and some form of compensation must be provided. In bevel gearing of the straight tooth type, this condition is compensated by the variation in tooth width along the tooth length, so that the problem is capable of ready solution in that form of gearing, the tooth engagement practically producing the same effect as the bevel friction pinion, the progressive increase in pinion diameter being the same in both cases, due to the fact that the bevel face is a straight face.

From this it is possible to understand somewhat of the source and nature of the problems to be met when assembling a rotating element in which the teeth are located on the side of the element rather than its periphery, with a companion element to form a drive relation therebetween—the location of the teeth zone of the element B sets up the variable radius condition with its speed variations, and hence the companion element must be arranged to meet this condition. Where this assembly is individual to itself, as in straight tooth bevel gearing, the speed variation can be compensated by the tooth formation. Where, however, it is desired to utilize the same pinion element with a gear element having its teeth in this location as well as with an element in which the teeth are arranged on the periphery of the element (with the assembly either individual or collective), the problem is complicated by the need to also provide for proper tooth engagement with the element carrying the peripheral teeth. The latter tooth engagement is readily provided by an assembly of the character of worm and worm gear structures, the reason for utilizing the arcuate pitch cone gear as the element common to both types of companion gears.

The cone gear, however, carries an arcuate pitch line, and this provides for the non-uniform progressive increase in diameter of the cone gear in its elongate plane—thus distinguishing from the usual straight-tooth bevel pinion—and hence the slippage condition referred to must be compensated in a different way. In actual practice, this compensation is mainly provided by the helical angle characteristics of the cone gear, the latter absorbing this slippage condition. However, this fact sets up problems bearing more particularly on the helical angle itself, due to the fact that the cone, in assembled position, must necessarily properly cooperate with the teeth of the companion element, and since the teeth of the cone are in the form of threads and hence spirally arranged, it can be understood that the helical angle development must not only provide the compensation for the speed variations referred to, but must do it with a form which will properly and efficiently operate with the companion element.

From this it can be understood that the problem characteristics are such as to necessitate the use of a cone gear of very definite characteristics, with each cone gear individual to the element with which it is to co-operate. For instance, change in dimensions of the companion element, or a change in the drive ratio, or change in pitch relation, etc., each affects characteristics of the cone so that the latter becomes more or less individual to the companion element when the latter has its tooth zone on the location.

However, I have discovered that where the cone gear is developed along certain definite lines or with certain definite rules or laws, the cone gear can be properly mated with the companion element, thereby enabling the designer to meet any of the conditions which may be set up by these variation characteristics. In actual fact, the rules or laws, when amplified, enable this mating relation characteristic to be extended to gearing of this type arranged in hypoid positions, or into positions where the angularity of the element axes is otherwise varied.

To enable an understanding of these rules or laws and their characteristics, a number of views, more or less diagrammatic are being presented, in order that a clear understanding can be had such as will enable the designer to meet the conditions which confront him.

Figure 1:
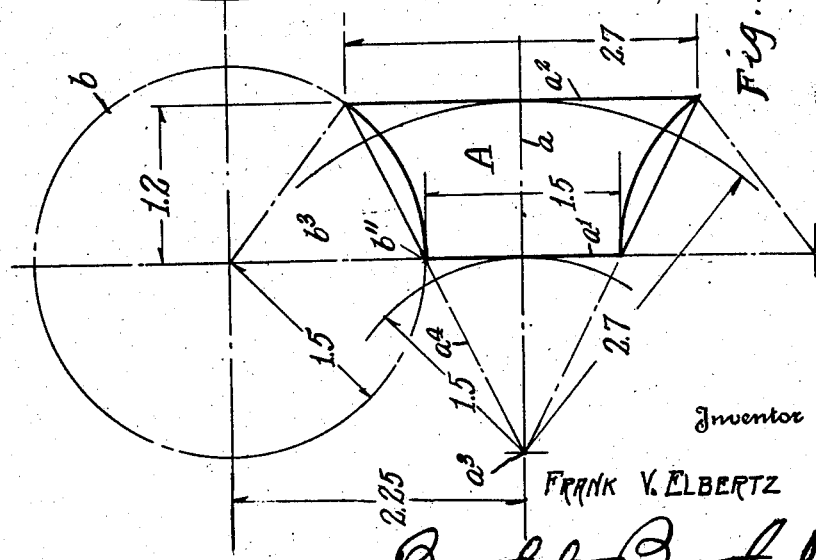

From the above explanation it can be understood that there are two points of the cone in which there is no requirement to set up compensation—the opposite ends $a'$ and $a2$; with these points in similar ratio to corresponding points ($b$ and $b'$) of the companion element, these two points have similar speeds. In this respect the conditions are similar to those of straight tooth bevel gearing; in the latter, however, the circle $b'$ or end $a2$ is used as the basis on which to begin the development, this being possible because of the straight-tooth characteristic. With the present invention which involves the arcuate pitch cone gear as the cominant part, and the spiral thread characteristic of such cone gear, the circle $b$ is considered as the foundation or ratio circle. The reasons for this can be understood somewhat from Figure 1, which presents the development of the cone used in the position of Figure 2, to which reference was previously made. In Figure 1 the circle shown is circle $b$ of Figure 2, this circle representing the ratio circle being used in the development and can be considered to be the pitch circle of a gear or wheel used for generating purposes. The ratio of gear and cone in these two figures is that of 2 to 1, this ratio being used for this particular explanation.

As will be seen the end $a'$ of the cone lies as a continuation of the vertical diameter of circle $b$, thus placing the axis of the cone as at right angles to that of the circle $b$, but planes extending horizontally through both axes are in parallelism. As indicated, the radius of the gear is assumed to be 1.5 inches and that of the cone as .75 inch, thus setting up the two-to-one ratio, the distance between the planes of the axes being 2.25 inches. These dimensions are representative only for the purpose of the explanation, it being readily understood that actual dimensions would depend more or less upon the desired pitch relations and conditions of the cone gear, these being determined by various factors well known as being required for particular service conditions. The dimensions of the generating circle and those of the small end of the cone gear would be based on these conditions and the fact that the number of the teeth of the generating circle need be in proper ratio to the number of pitch threads to be used.

Having determined the pitch relation etc., that is to be employed, and having the desired ratio conditions, and assuming the latter to be the two-to-one ratio shown with the particular dimensions indicated, the essential is to determine the distance of the larger end $a2$ from the small end $a'$ of the embryo cone gear—thus determining the length of the cone gear on its elongate or axial plane. I have found that if the axis $a$ of the cone gear be extended beyond the end $a'$ a distance equal to a radius of circle $b$, a distance represented by point $a3$, a line $a4$ drawn from such point ($a3$) through the point where line $a'$ intersects the circle $b$ (indicated as $b''$) and continued until it in turn intersects circle $b$—as at $b2$—will present, within circle $b$, a chord length which will correspond to the chord of the arcuate pitch circle of the proposed cone gear. By then drawing a line from point $b2$ parallel to the line $a'$ the length of the elongate plane will be determined. By setting up a complemental angle to that of $a3$, $a4$ and $a$ and of equal dimensions on the opposite side of the latter by extending a line $a5$ from point $a3$ to intersect the end lines of the cone gear, and thus complete a cone, the chord characteristic of the opposite side of the cone will be produced, and by using the radius of $b$ as the radius for the arc of the ratio circle of such side, the embryo cone gear will be symmetrical with respect to its axis and the line projected from point b2 and intersecting line a5 will present the diameter of the larger end of the cone. As indicated in Figure 1, the diameter of the larger end of the cone would be 2.7 inches under the conditions illustrated, with the length of the elongate plane as 1.2 inches.

If the element A of Figure 1 be shifted to a position where its axis will overlie the horizontal diameter of circle b and with the intersection of lines a and a' overlying the point where such diameter intersects circle b (the position of Figure 2) if a circle be drawn concentric with circle b and having as its radius the distance from a3 to the point of intersection of axis a with line a2, the circle will have the dimensions and characteristics of circle b'. Circle b' and end a2 will have the same ratio characteristic as circle b and end a', with the result that the peripheral speed at an end of element A is exactly equal to the peripheral speed of that portion of element B with which such end is in contact.

By comparing the showing of Figures 1 and 2, the above will be seen as true. The arc drawn from point a in Figure 1 having the radius of circle b is an arc similar to that portion of circle b in Figure 2, to which line a' is tangent, and the portion of circle b' in Figure 2 to which line a2 is tangent, corresponds to the arc of longer radius drawn from point a3. If the cone gear then be completed with the proper helical angle conditions, and the cone gear used as a hob for producing the tooth zone of B will set up the two elements of the assembly in such way as to provide for the proper mating of the cone gear and companion element in this position. The helical angle conditions will be discussed hereinafter in detail, and are not presented at this particular point.

Figures 5, 6:
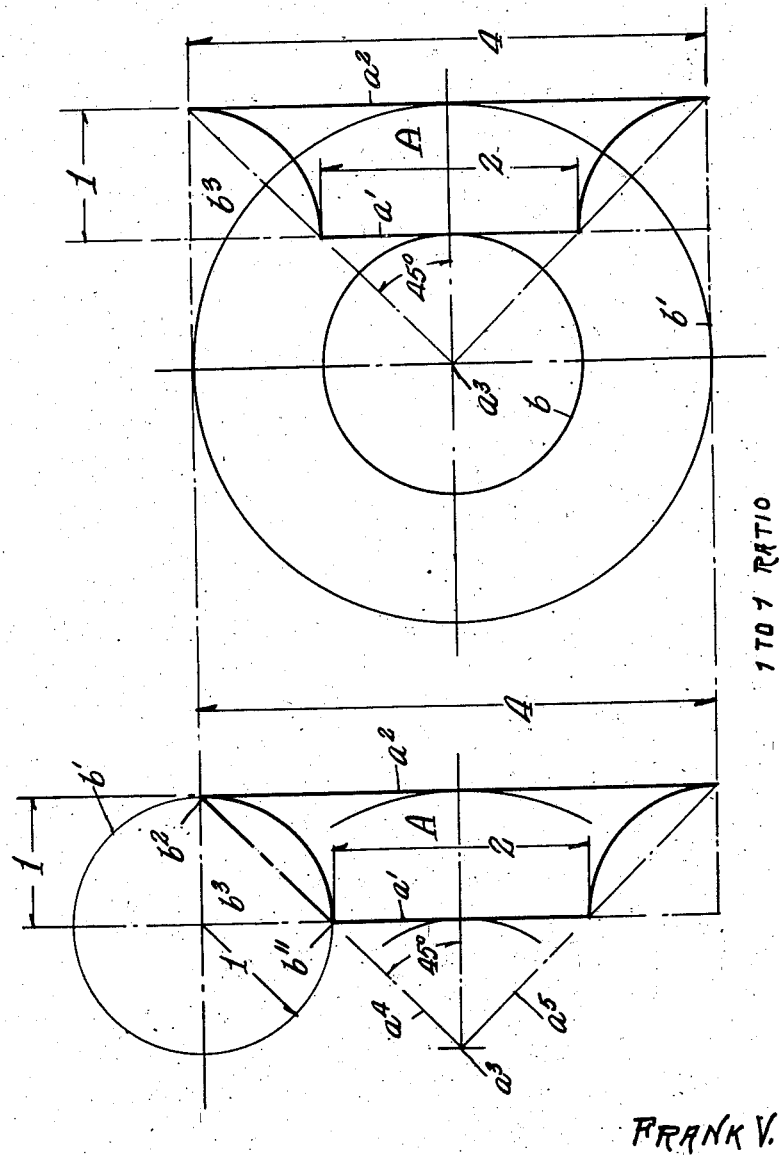
Figures 5 and 6 are similar views of development with the ratio as one-to-one.

The general development characteristics thus far explained will apply to all ratios of gearing, so far as the assemblies are arranged in the relations indicated—the axis of cone and companion element intersecting. This can be understood from Figures 3 to 6, which present the development characteristics at different ratios. For instance, in Figures 5 and 6, are presented the development of these elements on a one-to-one ratio, while in Figures 3 and 4, the ratio is that of three-to-one—the reference characters used are similar to those of Figures 1 and 2, which have been explained in detail, to illustrate the similarity in the development of the showing. In each case the circle b represents the ratio circle and b' the outer circle of the tooth zone of the companion element. The dimensions of these vary as between the several views as do the dimensions of the cone, but the development characteristics are the same in all. The point a3—equal to a radius of the ratio circle forms the point from which line a4 is developed, and the same radius provides the pitch or generating circle of the cone gear. The angle b3 included within the length of the chord of the arcuate cone circle pitch is twice that of the angle of which the line a4 and axis a are sides, or equal to the angle of which lines a4 and a5 are the sides. The lines a' and a2 are tangent to circles b and b'. The dimensions and ratios vary, but the method of development is the same, and is usable under all conditions where the assembly has the cone gear axis positioned co-incidental with a radius of a companion element of this type.

Thus far the detail description has dealt with assemblies in which the cone has been located in the usual bevel gear position—the cone axis being located on a radius of the companion element with the respective axes at right angles one to the other. As will be understood the development characteristics have been along the lines of ratio conditions.

When, however, the cone is to be used in a hypoid position, the shift in position sets up additionally the conditions of proportion, so that such shift involves more than a simple movement of the cone to its new position. This will be understood from the following:

In a hypoid position, the cone is shifted the desired distance, the cone axis no longer coinciding with a radius of the companion element but extending parallel to such radius. As a result, the cone axis, in its new position becomes angular to a radius of the companion member, the angularity depending on the extent of shift from such radial position. Obviously, the shift from the radial position to a position, parallel to the radial position, increases the length of a line connecting the circles b and b' when located in said position of parallelism. Since such line would correspond to axis a, it can be understood that the increase in line length will represent a corresponding increase in the length of the elongate of the embryo cone gear intended for use in the shifted position, this increase being due to the angularity conditions set up by the angularity relation of the cone gear axis in this new position to a radius of circles b and b' which intersects circle b at the new position. Since the ratio characteristics between the diameters of circles b and b' with the diameters a' and a2 of the cone is to be preserved, with the helical angles at such ends similar to those used before, it will be obvious that the development of the helical angle must be changed to compensate for the increase in the length of the cone on its elongate plane, with the change based on the relative proportions of the two distances. Such helical angle change is provided by changing the length of the radius of the cone gear pitch circle, so that in the shifted position, the length of radius of the ratio circle and that of the radius of the generating circle are no longer equal, as in the development of the embryo cone gear for the radial position, but because unequal in length, the length of radius of the ratio circle remaining as before, the length of radius of the generating circle being increased proportionately. The amount of increase in the length of radius of the generating circle will depend upon the length of shift of the cone gear to its hypoid position. Obviously, one of the problems involved is that of finding the length of radius of the arcuate pitch circle of the cone gear in the new position. This involves certain additions to the development work previously described, to set up proper conditions for fixing this radius length. The developments can be readily made mathematically, but for the purpose of the present explanation, the developments will be assumed to have been along the lines previously described, and in which the embryo cone gear was located in the radial position. A simple explanation of the succeeding developments will thus present characteristics of the development of the cone gear for the new position.

Figures 7, 8:
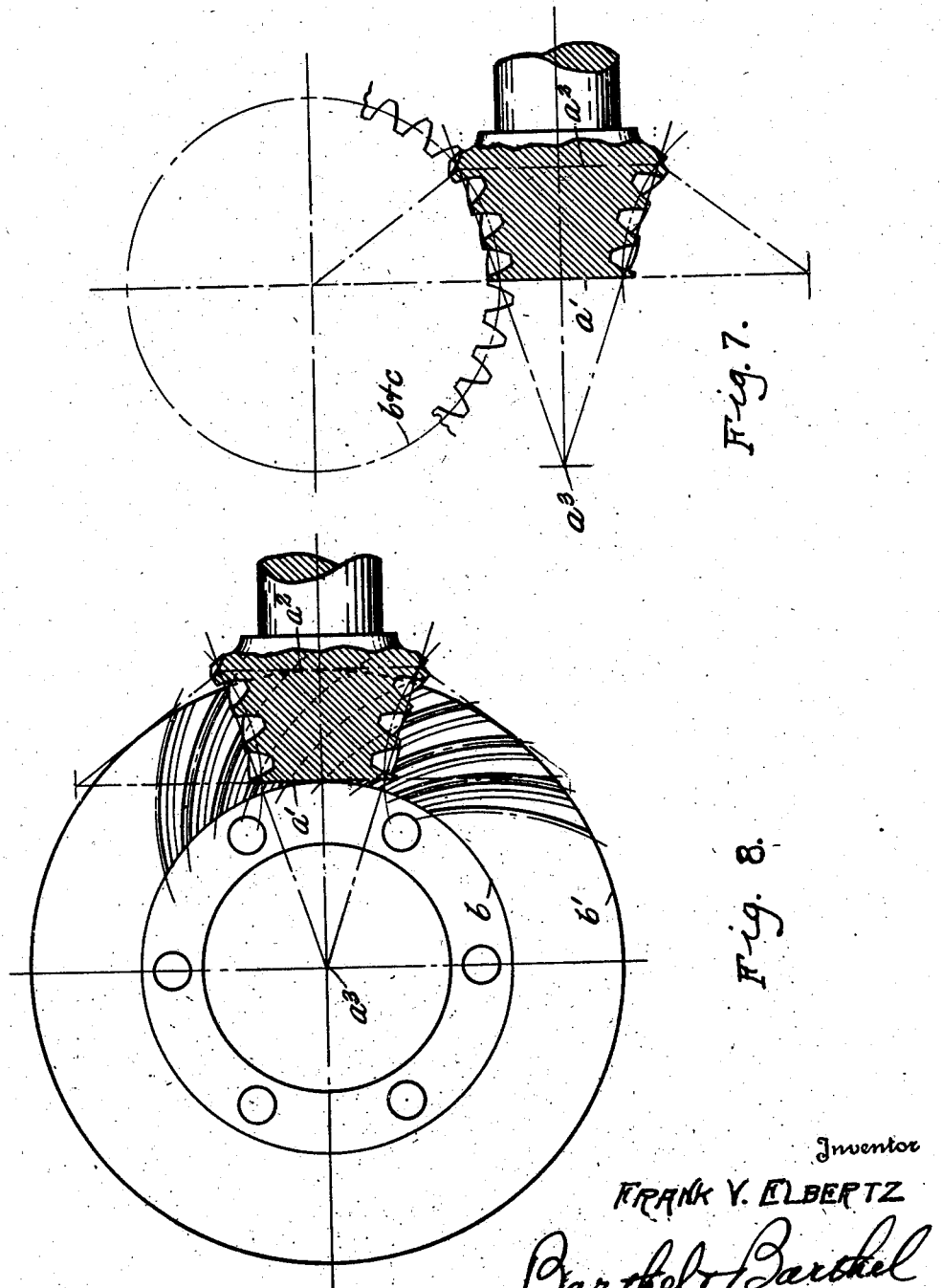
Figure 14:
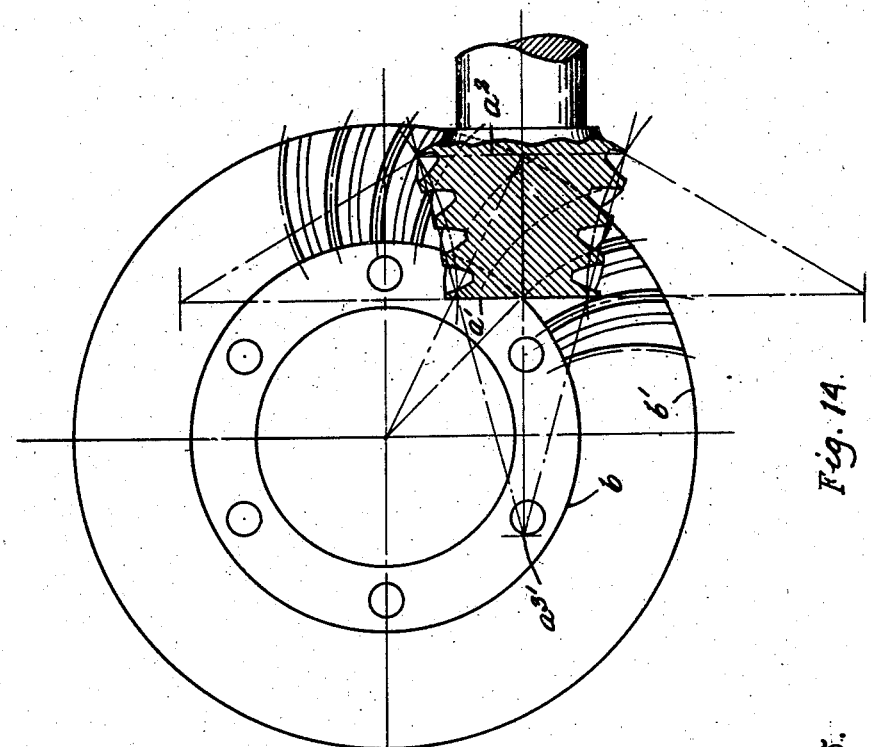
Figure 14 is a view of the completed element in the position of Figure 13, Figure 15 showing the same element in position relative to its generating circle.
Figure 15:
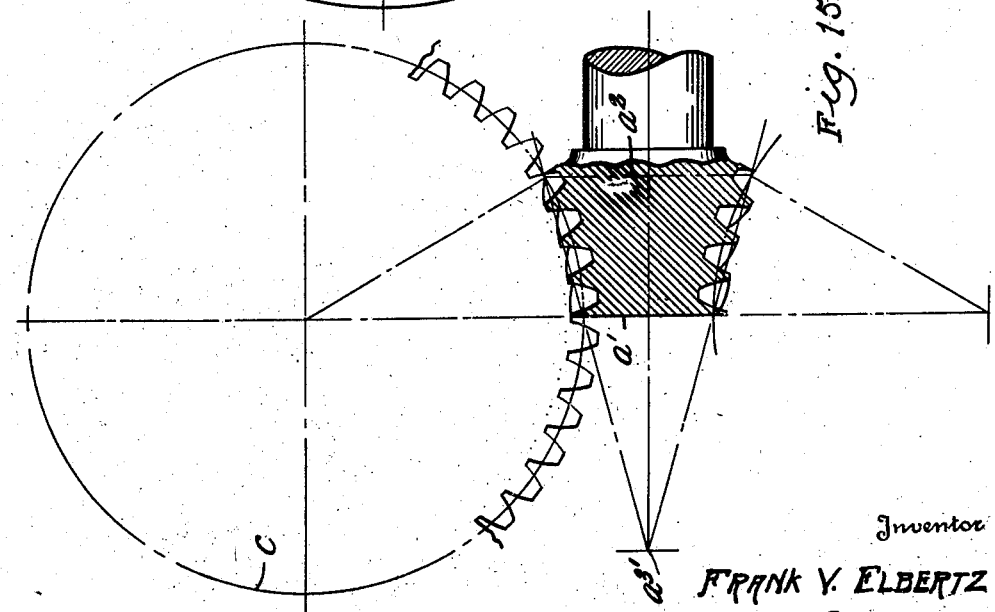

Assume for instance, that the cone of Figures 8 and 8a is to be shifted to a position 30° below the position of this figure—the position shown developed in Figure 10. As indicated in the latter figure, the length of the axis a between circles b and b' is accordingly increased. If this increase be transferred to the cone A of Figure 4, by shifting the diameter represented by line a2 in this figure to the right a distance equal to this increase in elongate plane, leaving the line a' unchanged, this increase in the length of the elongate will be carried into the diagram of Figure 4; the point b2 will thus be shifted to the right the equivalent distance in this figure, thus providing a new point (b2') which, with the point of intersection of line a' with circle b at b'', will permit of the development of a line similar to line a4, but which will intersect the line a at a different point, thus shifting the position of point a3. The change in line and point are due to the change in position of point b2, with this change retaining the previous diameter represented by line a2.

The new line thus developed—and which may be indicated as a4' takes on the characteristics of line a4 in the development of an included angle corresponding to the angle b3 previously referred to and which includes as one of its sides the radius of the arcuate pitch circle of the cone, as indicated by a comparison of Figures 4 and 10. A comparison of these two figures will indicate that since angle a3, a and a4 presents half the angle b3, line a4 will define a similar angle a3', a and a4' equal to half of the angle b3' with one of the sides of the angle (b3 or b3') provided by an extension of line a' in both cases with the length of such side equal to the length of the radius of the arcuate pitch circle of the cone gear, the chord of such circle being that portion of line a4 or a4' which lies between lines a' and a2. By erecting from point b2 a line b4 to produce an angular relation between it and the extended line a' equal to that set up by the developed included angle of which the angle a3', a and a4' is one of the two angles, the line b4' will intersect the extension of line a' at the axis of the generating circle to be used in developing the arcuate pitch circle of the cone gear, and complete the angle b3'.

As indicated, the point of intersection of line a with line a' will lie at the point where line a intersects circle b, while the intersection of line a with line a2 will lie at the point where line a intersects circle b', thus shifting the position of the embryo cone gear relative to the vertical diameter of the ratio circle b from which the initial embryo cone gear was developed. Having the position of the axis of the generating circle, and the cone gear dimensions, as well as the development lines of the latter, the thread development can proceed similar to that employed in completing the cone gear used in the radial position, this condition being indicated in Figure 10.

A comparison of Figures 12 and 13 will indicate graphically one of the effects set up by this shift of the embryo cone gear to the hypoid position. As heretofore explained, when the cone gear is used in the radial position, the ratio circle and the generating circle are of equal diameter, so that they can be considered as interchangeable. Comparing Figures 12 and 13, however, it will be seen that the generating circle, indicated as C, has a considerably greater diameter than has the ratio circle b. Although there is this distinction, the cone gear development is based upon and used with the companion element having the dimensions and ratios designed for the cone gear used in the radial position. The change in the length of radius of the arcuate pitch circle of the cone gear has changed the contour of the pitch circle so as to require a change in the contour of the complemental pitch circle of the companion element, but the operation of the assembly is similar in the two structures, the effective tooth zone not having been reduced—in fact, the increase in length of the elongate plane will tend to increase the length of the zone, a condition that is actually present as the degree of variation in position of the cone gear in hypoid direction is increased.

The general conditions of the development are graphically portrayed in Figures 12 and 13, in which the cone gear is shown as finally located in the hypoid position of 45°. In Figure 12, the position 1 of the cone relative to the ratio circle b indicates the initial development work which produces the radius of the end a2 of the proposed cone as well as an elongate length by which the radius of circle b' is determined when the embryo cone gear of position 1 is shifted to position 2, the radial position; if the assembly is to be of this radial type, the elements of the assembly are then completed on this basis. In Figure 13, the embryo cone gear, in the full line showing, has been moved to the hypoid position, indicated at 3, relative to the companion element of Figure 12, the full line showing of Figure 13, illustrating the contrast as between the dimensions of the ratio circle and that of the generating circle C, as well as the changed form of the cone when developed for this hypoid position.

To illustrate graphically the development characteristics above described as to the various changes made in ascertaining positions and values with respect to this shift in position of the cone, I have added to Figure 13, a dotted line showing of the development characteristics of Figure 12, as presented by the position 1; this is shown to indicate graphically the general similarity of both developments and at the same time indicate the character of the changes set up by the shift to the hypoid position. The dotted line showing of Figure 13 obviously does not present the true location of position 1 relative to the positions of parts in Figure 13, the full line position showing the similarity in position of circle b. To present position 1 in this dotted line position, the showing of position 1 has been passed through the position 2 and then to position 3, these shifts being made to permit ready comparison of the development characteristics as to similarity of the two embryo cone gears thus produced. A comparison of the dotted and full line showing of this figure will thus indicate characteristics of the changes made.

The hypoid position is not limited as to degree. For instance, in Figure 16, it is shown as positioned 90° from the radial position of the cone, the elongate plane being increased along the development lines indicated above and illustrated somewhat in Figure 17. Since this position indicates the maximum variation possible, and since the same relation can be set up through each right angle of the circle locating the position above the horizontal diameter instead of below, or by reversing the cone gear and locating it on the opposite side of the vertical diameter—will include all positions in which the hypoid characteristics could be utilized throughout the 360° of the circle. Structurally, the hypoid cone gear could not be shifted from one position to the other without change of the companion element, due to the tooth characteristics conditions, but the hypoid relation can be developed as above throughout the ninety degrees of a right angle regardless as to which right angle of the complete circle is considered.

Referring to Figure 17, showing the development of the cone in the 90° hypoid position, and assuming the proportionate elongate length has been obtained, the development characteristics used above are illustrated, but for the purpose of illustrating an alternate way of obtaining the length of the arcuate pitch circle radius, a few additional lines are indicated. Line $d$ is a line parallel to the cone gear axis drawn from the peripheral end of the radius of the small end of the cone gear (point $b''$) while line $d'$ is a similar line drawn from the peripheral end of the radius of the large end of the cone ($a2$) the point which has been indicated as $b2'$ heretofore; obviously, the distance between lines $d$ and $d'$ is equal to the difference in radial length of the two ends of the cone. If this parallelogram thus formed be bi-sected to produce two equal right-angle triangles, the line of bisection $d2$ sets up the characteristics of the chord of the arcuate pitch circle radius being sought. As will be understood, such bisection line $d2$ is actually a part of the line $a4'$ previously discussed, and the angle of either triangle is equal to the angle $a3'$, $a$ and $a4$; hence, one of these triangles—$x$ for instance—can be used in place of the angle $a3'$, $a$ and $a4$ in the development of the angle $b3'$. Since the angle $b3$ is twice that of angle $x$, the third side of angle $b3'$ is readily obtainable by using line $d'$ as the base and the extension of line $a'$ as the altitude of the new right angle, such third line (the hypothenuse of the angle) presenting the length of the radius of the arcuate pitch circle of the cone gear and the point of intersection of the altitude and hypothenuse of the angle indicating the axis of such radius. Under this method, line $a4'$ need not be completed to point $a3'$.

Other ways of obtaining the same results will be apparent, the two ways shown being sufficient to indicate the character of the various values to be obtained.

It will be apparent from these showings that since each hypoid position has the embryo cone gear of such length on the elongate plane as will equal the distance between the points where axis $a$ intersects the circles $b$ and $b'$ (in the 90° position the inner end of the elongate is at the point of tangency of the axis with circle $b$), and since the radial length of the small end of the cone gear is the same in each position, as is the radial length of the larger end of the cone gear, the same ratio relation between the ends and the circles will be maintained throughout the various hypoid positions. With the helical angle relationship at the ends of the cone gear the same in each position, the opposite ends of the cone gear will co-operate correctly with the inner and outer circles of the tooth zone of the companion element, regardless of the hypoid position. Due to variations in the length of the cone gear in the elongate plane, variations will be present in the intermediate helical angle portions, but these variations will be proportionate and are compensated by the variations in the arcuate pitch circle set up by the variations provided by the differences in the length of the radius used in developing the respective arcuate pitch circles. Hence, in any hypoid position, and with the companion element generated from the arcuate pitch cone gear used as a hob, the two elements will co-operate perfectly.

By a comparison of the figures showing the completed assembly in different hypoid positions, an additional characteristic development will be noted, and which is set up by the variations in length of the elongate plane. Assuming the pitch of the cone gear to be the same in each instance, it will be evident that as the elongate increases, there is also an increase in the tooth-contact characteristic on the line of drive activity, this increase taking the form of an increase in the number of teeth concurrently active. For instance, in the form shown, four teeth are shown in action in the radial position of the cone gear, while six teeth are shown in action in the 90° hypoid position; obviously, the tooth contact characteristic is largely increased by this condition. The same condition is true with intermediate hypoid positions, so that it becomes evident that as the assembly increases its variation from the radial position through the hypoid positions, the tooth contact increases with a consequent decrease in tooth pressure per tooth, so that the questions of tooth pressure become less severe as these variations increase. For these reasons, it can be understood that the hypoid assemblies are particularly adapted for use under conditions where the companion element need not carry the same metal characteristics as are present in the cone gear, making it possible that, in the 90° hypoid position, the companion element may be formed of a relatively soft metal such as brass or its alloys, due to the material decrease in tooth pressure per tooth brought about by the shift of the cone gear to this position.

Thus far the description has been with the relation of the two elements A and B on the basis of a similarity in the general angularity of the shafts of the two elements—for instance, a vertical plane taken lengthwise of the axis of one of the elements extends at right angles to a similar plane taken lengthwise of the axis of the other element; the planes do not always intersect at the same point but the general directions of such planes are right-angular to each other. In the worm and worm gear position, the cone gear member axis is at the lower portion of such vertical axis, with the plane intersecting the shaft axis of the worm gear within the body of the latter; in the radial position, the plane of the cone gear axis is shifted forward of the body of the companion element, with the axis of the cone gear at the upper portion of such plane so that a continuation of both axes would cause them to intersect at the intersection of such planes; and in the hypoid positions the plane of the cone gear axis remains forward of the body of the companion element, but is now located at an intermediate portion of this vertical plane of its axis. But in all of these distinctive locations, the two planes in question have retained this right angular relation, so that in this sense, the axes of the two elements extend in planes that are at right angles to each other.

The invention, however, is not limited to this particular relationship of the elements, and contemplates a gearing assembly in which the two planes in question may have an angular relation less than that of a right angle, and the description will now take up the characteristics of the gearing under such conditions.

A simple illustration of the change is indicated in Figure 19, in which the cone gear shown in the hypoid position of Figure 16, is, in effect, moved from its position in the latter Figure, to a position corresponding to that of the cone gear shown in the position of Figure 8. If the right angle angularity of the axis planes referred to were preserved, such change could not be made, since the elongate length of cone gear of the hypoid position is greater than the distance between circles $b$ and $b'$, taken radially, and hence the desired ratio conditions between the two units at points corresponding to the two circles $b$ and $b'$ and the ends of the cone gear would no longer prevail, since the two ends of the cone gear would not then establish the desired relation. If, however, the end $a'$ of the cone gear referred to be placed at the radial position of circle $b$ and the cone gear swung rearwardly with this point as an axis, the end $a2$ of the cone gear can be brought to a position where such end would lie on the radial point of circle $b'$, so as to again obtain the desired ratio relation between circles $b$ and $b'$ and the opposite ends of the cone gear. In taking this action, however, circle $b'$ no longer remains in its previous plane relative to the plane of circle $b$, but has been shifted rearwardly a distance sufficient to compensate for the excess of the elongate length of the cone gear. One effect of this change, therefore, is that of increasing the axial depth length of the companion element. Another effect is that the swing of the cone member in producing this result has changed the angularity of the plane of the axis of the cone member relative to the plane of the axis of the companion element from that of the right angular relation previously referred to, to an angularity less than that of a right angle, as indicated in Figure 19.

In its new position the cone gear has the same ratio relations with the companion element that it had with its companion element in the hypoid position, since the ratios at the ends of the cone member have not changed, and the radii of circles $b$ and $b'$ remaining as before, the change set up is in the companion element while the plane of the axis of the cone gear has been shifted to a different angularity to the plane of the axis of the companion member. As will be understood, the amount of depth change of the companion element is dependent on the length of the elongate of the cone gear, so that if the latter is known the above swinging action will indicate the axial depth of the companion element.

As will be understood, the cone gear shown in the hypoid position of Figure 4, can be moved to the radial position referred to by a similar action, the resulting structure providing a less variation from the right-angular relation of the cone gear plane than that just discussed (as indicated in Figure 21, for instance), since the end $a2$ of the cone gear would meet circle $b'$ earlier in the swinging movement, with the result that the axial depth of the companion element would be less. Obviously, if the elongate of the cone gear be greatly increased from that shown in Figure 19, the variation of the plane of the cone gear axis from such right angular relationship would be increased materially; this phase wil be discussed hereinafter.

From this it is evident that when the axis of the cone gear is shifted to the angularity position of Figure 19, as has been described, while retaining the ratio relations of its opposite ends with the circles $b$ and $b'$, the length of the elongate of the cone gear must be increased over that required in the position of Figure 8. And since the change in the angularity from the previously discussed positions adds this factor, it is evident that, for any given angularity, the length of this changed elongate must be ascertained.

This can be readily obtained by considering the relationships of angles, etc., by geometrical methods, utilized in a number of different ways, one of which is diagrammatically illustrated in Figure 20, in which the full-line showing illustrates the development on the basis of an angularity of 45° between the axes, while the dotted line position shows this angularity as 60°. The same radial dimensions of the companion element are present in both cases, and the same ratio relationship is present. The differences in the length of the cone gear in its elongate plane indicate the effects produced by the differences in angularity.

For the purpose of explanation of the development to ascertain the length of the elongate in this figure, the ratio is assumed to be that of three-to-one with the diameter of the ratio circle $b$ known, so that the axis and point $b$ of the companion member are known; from the developments which led to placing the cone gear of Figure 1 in its radial position, the diameter of circle $b'$ is also known, its depth, however, forming part of the present development work and ascertainable after the length of the elongate is known, by shifting the cone gear with point $b$ as the axis is shifted as explained in connection with the shift of the hypoid cone gear; the line 10 can thus indicate the radius of circle $b'$, since this circle at the close of the development work will be found at some point of this line.

For the purpose of the explanation, the development is assumed to be that of the 45° angularity of axis $a$, and this fact permits of the immediate location of certain points of the proposed cone gear. For instance, the end $a'$ of the gear will extend at right angles to the axis with the periphery end of the radius of such end coinciding with point $b$; and the length of such radius is, by the three-to-one ratio, fixed as one-third of the distance of the radius of the circle $b$. Hence, the location of the axis $a$ on line $a'$ is fixed, and such axis, being at the known angle of 45° will readily determine the location of the point of intersection with the line of the axis of the companion element, indicated as $a3$. The points thus far fixed permit of the application of line $a4$. In addition to these, the length of the radius of end $a2$ is also known from the development of the cone gear of Figure 1, which was used in the obtaining of the radius of circle $b'$, so that the problem is that of locating the proper position of line $a2$ on the axis $a$.

A comparison of the two positions shown in Figure 20, indicates that the rectangular triangles $m$ and $m'$, one side of which is the radius of the end $a2$, with the hypothenuse provided by the line 10, while the third side is provided by axis $a$, indicates that the angle between the side 10 and side $a2$ of the triangles $m$ or $m'$ is equal to the complement of the angle between the axis $a$ and the axis of the companion element, or the axis of circle $b$. Hence, if line $a2$ be positioned along the axis $a$ at a point where the angle between line $a2$ and line 10 presents the equality in angle to that of the complement of the angle between the respective axes, the position of line $a2$ will be fixed, thus indicating the length of the elongate between lines $a'$ and $a2$. And having this elongate, the position of the axis of the generating circle and the length of the radius of the arcuate pitch circle radius can be readily obtained as with the cone gear of the hypoid positions.

As will be seen from the elongate planes of the cone gear in the two positions, the length of the elongate increases as the angularity between the two axes decreases, and from the comparisons made in connection with the cone gear in the hypoid positions, the radius of the arcuate pitch cone circle is also increased. From this it can be understood that if the angularity between the axes be decreased to a point where the angle is small so that the two sides approach parallelism, the elongate will be increased to a point where the extreme length of the radius of the arcuate pitch cone circle will cause the curvature of such circle to approach a straight line, with the result that the threads of the cone gear become closely analogous to the helical teeth of a pinion arranged in spur gear relation. As will be understood, the limitations as to the decrease in the angularity between the axes of the cone gear and its companion element are set by the ratio relation of the two elements. For instance, elements having a two-to-one ratio can approach closer to parallelism than where the ratio is three-to-one. The nearest approach to parallelism is reached when the ratio is that of one-to-one.

One other characteristic present when the axis of the cone gear is shifted in this manner, is indicated by the disclosure of Figure 19. As the arcuate pitch cone represents an arc of the pitch circle, and the teeth of the companion element are complemental thereto on the pitch circle of that element—being cut by the cone gear used as a hob—the contour of the thread zone of the companion element takes on the character of a zonal portion of a sphere, thus indicating the possibility of use under conditions where such a form of companion element is desirable, in which case a development which utilizes the cone gear in this relation is especially applicable.

As will be seen from the above description and an inspection of the diagrams referred to therein, there is a general sameness in the development, with the changes in position of the cone gear and the change in angularity of the cone gear axis relative to that of the axis of the companion member, presenting their individual problems which are met individually, the disclosure in this respect being progressive, since the previous developments are utilized in the development of the succeeding phase. This form of presentation is being employed to permit of ready comparison, and by its use diagrams to meet all conditions referred to can be readily developed by following the developments indicated. Obviously, the actual dimensions which may be present or desired are not indicated, these being the problem of the designer when fashioning the particular gearing he contemplates producing to meet his condition.

It will be understood, of course, that the various diagrams can be produced in other ways than the simple ways indicated. To the designer of gearing, for instance, the various structures shown can be developed by the application of the teachings of geometry and higher mathematics, the designer being aware of these and their application, so that from the information given a particular diagram can be produced by and application of these rules, the diagrams themselves presenting clues which permit this result to be obtained to secure the essential accuracy that is required in the construction of gearing.

When these diagrams are considered and compared, a number of characteristic conditions are found and some of these will be briefly referred to.

In each case, the opposite ends of the cone gear remain in similar ratio to circles $b$ and $b'$, regardless of the position the gear may have relative to its companion element. The distance between these ends of the gear—the elongate of the cone gear—changes as the positions change (excepting when considering the worm and worm gear position in which circle $b'$ is not utilized—and the radial position of the axis—in which position the circle $b$ is developed) but the end dimensions remain constant. Since these variations in the elongate are proportionate with respect to the helical angle conditions, this dimension (the elongate) can be considered as of proportional characteristic and is of very definite and important value in the development of the cone gear, since within it the variations in speed in the intermediate zone of the tooth zone of the companion element are absorbed by the helical angle of the gear. But the proportional changes of the elongate are in themselves determined by the ratio relation of the end $a'$ to the ratio circle $b$, so that the cone gear has ratio-proportional characteristics, considered individually and combinedly, and these characteristics are so combined as to make it possible for a gear, constructed along the lines indicated, to be used with a companion element in the relationships of the various types of gearing previously employed. The cone gear changes some of its physical characteristics, but in its general characteristics it is the same gear in each case. And this is true where the assembly differs from these types, as is evidenced by the various developments referred to, which show a few of the possibilities opened by the use of a gear of this type.

The cone gear is usable in each of the positions indicated, at any ratio desired, there being no material restrictions in this respect. And, because of its characteristics, the gear can be used concurrently with an assembly made up of a worm gear and any of the remaining forms of companion element, both co-operating with the cone gear, as indicated in Figures 22 and 23. In this respect, the relative positions about the axis of the cone member is limited as to range only by the need for preventing interference between the elements.

While the generating circle used in producing the arcuate pitch cone circle is, in some of the positions, different in radius from that of the ratio circle, this does not require that the worm gear used with the cone gear have the generating circle radius dimensions. As indicated in Figure 23, the worm gear may vary materially in diameter from that of the generating circle, the worm gear in said view having the diameter of its pitch circle corresponding to that of the ratio circle for the second companion element shown; in such case the worm gear and cone gear operate under the differential conditions disclosed in my companion application filed January 10, 1933, Serial No. 651,029, the two pitch circles being in tangential enveloping relation, as indicated in this view, the cone gear presenting the characteristics of the larger gear of an internal spur gear differential assembly, while the worm gear has the characteristics of the smaller gear of such differential assembly.

The ratio conditions are ideal, since they present no limiting factor. Whether one-to-one or ten-to-one, the cone gear of the present invention is usable in the different positions indicated, so that the type herein presented provides for complete flexibility as to selection by the designer who is thus able to meet any of the problems confronting him. And among these problems, that of tooth pressure is especially favorable, since the hypoid possibilities permit any desired reduction in this relation, and at the same time enable advantage to be taken of this position with respect to shift positions.

No limitations are present with respect to the matter of pitch relation as between the elements, since the conditions are such that complete flexibility is present and the designer is free to make his selections in accordance with prior practice. In other words, the present invention provides no restrictions in this direction.

The discussions thus far have related to what has been termed the "embryo cone gear"—the foundation upon which the gear is to be constructed so far as its controlling dimensions are concerned. The term does not refer to the completed blank which is fashioned into the complete cone gear by cutting the threads, since the blank must necessarily include the metal from which the threads are fashioned. This can be understood from the fact that the generating circle referred to represents the arcuate pitch circle of the proposed cone gear, the depth of the threads being found on opposite sides of this circle as is usual in gear development work. Since the blank must include metal sufficient to include the portion of the thread which would project from the pitch line in the complete gear, it is obvious that the blank dimensions would not conform to those presented in the discussions. The term thus refers more particularly to the "development lay-out" which serves to present the dimensional characteristics required for use in the completion of the cone gear lay-out; with the latter completed, the dimensions of the physical blank required will be readily understood.

The succeeding development of the lay-out is similar with each of the positions indicated, involving simply the delineation of the tooth-engaging section along the pitch line, the embryo gear cone shown being considered as a section taken on a diameter of the cone gear with the plane of the section assumed to correspond to the line of tooth activity of the assembled elements. The laying out of the teeth follows more or less conventional lines, so that no detail explanation in this respect is necessary. A few conditions should be met to produce the maximum efficiency conditions which the invention contemplates. One of these is that the tooth depth should be such as to at least reach the chord of the pitch circle used; if a less depth be employed, the assembly will remain operative, but the characteristics of the desired slippage are less favorable. A second characteristic is that each tooth by symmetrical to a radius of the generating circle individual to the tooth and passing through the top of the tooth. The teeth are preferably formed with profiles of the involute type, although the assembly is operative with straight profiles, the action being less favorable than where the involute form is used.

The complete embryo cone gear being developed, the blank for the production of the element itself is provided and prepared to the point of cutting the teeth, the operation in cutting the latter following generally the usual methods of cutting worms. The general method practically involves the use of a generating element, exemplified in the drawings by the reference character C—the showing might be considered as a lamina of the generating element—which rotates about its own axis, while the positioned cone gear blank is rotating about its own axis. Since the vertical planes of the two axes extend at right angles, the resultant of the two motions is the production of the threads of the cone gear. If the teeth of the generating member have involute profiles, it is obvious that the threads will be complemental in this respect, thus setting up the relationship indicated at the right in Figure 24, in which the tooth zone of the element B can be considered as the tooth development of the generating element C, so that when the generating element and cone gear are given the proper speed ratio, the two elements will have the relationship indicated within this zone at the point of tangency when the cone gear threads have been cut.

The helical angle produced necessarily varies as it develops from end to end of the gear, since the increasing diameters of the gear in the direction of end $a2$ inherently produce this result, producing variations of the helical angle of involute characteristic relation. With the axis of the generating element located on a continuation of line $a'$—thus placing a radius of the generating element at exact right angles to the axis of the cone gear at the small end of the cone gear, adjacent radii of the generating element intersecting such axis at a variation from such right angular relationship, the diameter increase of the cone gear toward its larger end is along definite lines, with the increase effective to set up the involute helical angle conditions essential to compensate for the slippage conditions needed between circles $b$ and $b'$, so that such slippage is absorbed by the helical angle; in bevel gearing this slippage is absorbed by tooth angle—by the present invention the absorption is by helical angle, so that, in effect, the tooth angle of the bevel gearing type is absorbed by helical angle.

After the cone gear thus fashioned, it can be utilized as a hob for cutting the companion element a characteristic that is a common expedient in worm and worm gear structures. This expedient is also applicable in cutting the helical teeth of the companion element, the cone gear, when fashioned along the lines of the present invention, being of a conformation which will produce such helical teeth with exactness and capable of setting up the relationships disclosed at the tooth zone shown at the right of Figure 24 on the line of drive activity of the two elements. The tooth profiles are shown as involute in this view, and with such formation, the particular relationships shown will be produced.

The result and the effects thereof of a development such as this is indicated on an enlarged scale in Figure 25 which presents a section taken on the lines 25—25 of Figure 24, this line being the arc of the pitch circle, so that the teeth of each element are cut by the line of section at the same point, and thus enables a definite comparison to be made along the line of drive activity indicated as line $a$. As indicated, the respective profiles on the line are in contact and therefore in complete drive relation with this relation similar with complemental teeth along such line, ensuring that the total tooth pressure present will be equally distributed as between the teeth; thus limiting the tooth pressure per tooth to its proportionate share of the total pressure. This condition is made more effective from the fact that, as indicated in Figure 24, the contact is also present substantially throughout the depth of the teeth on this line, so that maximum efficiency as to tooth pressure conditions is provided.

Another characteristic is present as a result of this development, as indicated by Figure 25. As will be seen, helical faces of the teeth have a tangent helical enveloping characteristic relative to the opposing faces, with the point of tangency progressing through the arcuate pitch circle along line $a$, tending to set up a differential characteristic relationship such that as a thread and tooth approach the point of tangency to produce the drive action the approach is such as to bring the opposing faces into this contact relation with a minimum friction condition and an assurance of quietness in operation.

Similar conditions will be present where the cone gear is used in the worm and worm gear relationship, excepting under conditions such as shown in Figure 23, in which a differential relationship is present, so that the profiles also become tangent.

These features are common to the structures assembled under the various assembly conditions presented herein. Although the elongate may be lengthened as the position of the gear is shifted to hypoid position, the change in the radius of the arcuate pitch circle proportionately changes the intermediate portions of the helical angle to meet this condition; the pitch relationship remains unchanged. This can be understood from Figure 16. The speeds are obviously the same on all radii of the element B but the speed of any particular intermediate radius of the cone gear of Figure 8 will be made manifest at a different point along the axis of the cone gear of Figure 16; hence the increments added for a unit of increased speed extend for a greater distance with the gear of Figure 16, but the increase in increment length provides the same speed characteristics in both cases through the proportional characteristics set up by the change in radius of the generating circle and the resultant change in the depth of the arc and its progressive development relative to the chord along the arcuate pitch circle—developments that are proportional—thus providing the necessary compensation under all conditions. It may be noted, in this connection that the generating circle is at all times in ratio relation with the end $a'$ of the cone gear, although not necessarily of similar ratio to such end as is present in the ratio circle, there being no necessity for a definite ratio relation between the ratio and generating circles excepting that both circles have a ratio relation individually with such end. A comparison of the relationship of the minor end of the cone gear and the inner circle of the tooth zone of the companion element, as presented in position 2 in Fig. 12, in Fig. 13, Fig. 17, and Fig. 20, indicates that such relationship presents the characteristic of a point coincidence therebetween, whether the relationship be that of tangency, as in Fig. 12, or intersecting, as in the remaining Figures referred to, the point of coincidence being located on a plane extending through the cone gear axis in the direction of length of such axis and which plane extends normal to the plane of the circle and intersects the circle at such point. And, in addition, the comparison of said figures also indicates that the axis of the cone gear extends normal to a diameter of the two circles, whether the gear be positioned radially, as in position 2 of Fig. 12, or in the hypoid positions of Figs. 13 and 17, or as in Fig. 20, these various positions indicating that such condition is true throughout a range corresponding to a radius of the inner circle; and since it is obvious that the same conditions would be presented if the gear be positioned above instead of below the position 2 of Fig. 12—as heretofore explained—it is obvious that this relationship extends throughout a range corresponding to the length of the diameter of the inner circle.

Other figures of the drawings not specifically referred to are presented to show appearance of structures, relationships, etc., these serving to aid in an understanding of the invention, the essential characteristics of which are presented above.

While I have herein shown and described various forms and characteristics to be found within my invention, it is obvious that variations, changes and modifications therein may be found desirable or essential in meeting the various exigencies of use or the particular desires of users or designers, and I desire to be understood as reserving the right to make any and all such variations, changes or modifications as may be deemed desirable or essential, insofar as the same may fall within the spirit and scope of the invention as expressed in the accompanying claims when broadly construed.

What is claimed is:—

1. In gearing assemblies, wherein two or more rotating elements co-operate in drive relation through co-operative tooth or thread action, an arcuate pitch cone gear having the pitch circle of its tooth or thread zone arcuate in the direction of length of the gear, and a companion element having an annular tooth zone presenting a plurality of teeth on a radius of the element, said element tooth zone being such that when assembled with the gear, the teeth of the element tooth zone will co-operate with the gear teeth or threads to combinedly produce the characteristics of engaging teeth throughout the length of the arcuate pitch circle of the gear presented on the line of drive activity of the assembled gear and companion element.

2. An assembly as in claim 1 characterized in that the line of drive activity is located on a radius of the element with the width of the element tooth face on such radius equal to the length of the elongate of the tooth or thread zone of the gear.

3. An assembly as in claim 1 characterized in that the line of drive activity is located spaced from and parallel to a radius of the element, with the width of the element tooth zone on a radius of the element less than the length of the elongate of the tooth or thread zone of the gear.

4. An assembly as in claim 1 characterized in that vertical planes extending in the direction of length of the axes of gear and element will intersect at an angle other than that of a right angle.

5. An assembly as in claim 1 characterized in that the tooth zone of the companion element is of pitch circle characteristics on a radius of the element with such pitch circle complemental to that of the gear.

6. An assembly as in claim 1 and a second companion element having peripheral teeth co-operative with the tooth or thread zone of the gear, whereby both companion elements are co-operative with the gear individually or collectively.

7. An assembly as in claim 1 and a second companion element having characteristics of the worm gear of a worm and worm gear assembly, said worm gear being co-operative with the tooth or thread zone of the cone gear, whereby both companion elements are co-operative with the cone gear individually or collectively.

8. An arcuate pitch cone gear adapted for service in gearing assemblies, said gear having a tooth or thread zone formed relative to an arcuate pitch circle extending lengthwise of the gear, said gear having its characteristics such as to co-operate individually or collectively with a pair of companion elements the teeth of which differ in direction of tooth depth relative to similar planes individual to the elements and intersecting the axis of the element at right angles to the direction of length of the axis of the element.

9. A gear as in claim 8 characterized in that one of the elements has the characteristics of the worm gear of a worm and worm gear assembly.

10. A gear as in claim 8 characterized in that the gear when assembled with one of the companion elements presents its tooth or thread zone relative to the tooth zone of the companion element to form a line of drive activity extending in the general direction of length of the gear axis and on which the teeth and threads co-operate to produce the characteristics of a plurality of teeth in engagement along such arcuate pitch circle with the element and gear each providing a plurality of such engaging teeth.

11. An arcuate pitch cone gear having the ends of its tooth or thread zone presenting the minor and major diameter dimensions of such zone, said ends being of similar ratio characteristic relative to concentric portions of the tooth zone of the companion element with which said ends co-operate in service, the length of the elongate of the gear between said ends being such as to cause the gear ends to rotate synchronously with such opposed portions of the companion element, the pitch circle of the cone gear being arcuate in the direction of the gear elongate and complemental to the pitch circle of the tooth zone of the companion element.

12. A cone gear as in claim 11 characterized in that the teeth or threads of the tooth or thread zone extend helically, with the radius length of the arcuate pitch circle determined by the length of the elongate of the gear.

13. A cone gear as in claim 11 characterized in that the teeth or threads of the tooth or thread zone extend helically, with the radius length of the arcuate pitch circle determined by the length of the elongate of the gear, the helical angles of the teeth or threads co-operating with the teeth of the tooth zone of the companion element to cause synchronous speed relationships of the opposing zones intermediate the ends.

14. A cone gear as in claim 11 characterized in that the length of the elongate of the gear extends and is determined from the end of minor diameter.

15. A cone gear as in claim 11 characterized in that the teeth or threads of the tooth or thread zone extend helically, with the radius length of the arcuate pitch circle determined by the length of the elongate of the gear, the progressive length of the helical teeth or threads of the gear being such that the intermediate portion of the elongate will rotate synchronously with the intermediate portion of the tooth zone of the companion element.

16. A cone gear as in claim 11 characterized in that the teeth or threads of the tooth or thread zone extend helically, with the radius length of the arcuate pitch circle determined by the length of the elongate of the gear, the helical angle characteristic of the gear tooth or thread zone being of involute characteristic relation and active to produce, when assembled with its companion element, a combined tooth zone in which the helical faces of the teeth have a tangent helical enveloping characteristic to the opposing faces with the point of tangency progressing through the arcuate pitch circle in the direction of the elongate of the gear on the line of drive activity.

17. A cone gear as in claim 11 characterized in that the teeth or threads of the tooth or thread zone extend helically, with the radius length of the arcuate pitch circle determined by the length of the elongate of the gear, the helical angle characteristic of the gear tooth or thread zone being of involute characteristic relation and active to produce, when assembled with its companion element, a combined tooth zone in which the helical faces of the teeth have a tangent helical enveloping characteristic to the opposing faces with the point of tangency progressing through the arcuate pitch circle in the direction of the elongate of the gear on the line of drive activity, with the tooth contact on such line of drive activity substantially equal to the depth of the teeth.

18. An arcuate pitch cone gear having the ends of its tooth or thread zone presenting the minor and major diameter dimensions of such zone, said cone gear being adapted to be assembled in co-operative drive relation with a companion element, the tooth zone of which is annular with its inner and outer diameters of definite and equal ratio to the diameters of the respective ends of the cone gear tooth or thread zone, with the end of minor diameter of the cone gear located relative to a circle corresponding to the inner diameter of the tooth zone of the companion element in a relationship wherein the end and circle have a point coincidence with the point located on a plane extending through the cone gear axis in the direction of length of such axis and which plane extends normal to the plane of the circle and intersects the circle at such point, the length of the elongate of the tooth or thread zone of the cone gear between such ends being of proportional characteristic relative to and determined by the ratio characteristics of the ends of the respective zones.

19. An arcuate pitch cone gear having the ends of its tooth or thread zone presenting the minor and major diameter dimensions of such zone with the tooth or thread zone developed symmetrical to an arcuate pitch line connecting corresponding ends of said diameters in the direction of length of the elongate of such tooth or thread zone, said cone gear being adapted for assembly with a companion element having an annular tooth zone, the inner and outer limits of which are located on concentric circles, the axis of the cone gear extending normal to a diameter of the circles within a range corresponding to the length of the diameter of the inner circle, said cone gear having the dimensions of its ends, the elongate of its tooth or thread zone, and its arcuate pitch line corresponding to those of an embryo arcuate pitch cone gear developed relative to a ratio circle corresponding in dimensions to the inner limit circle of the tooth zone of the companion element to produce the dimensions of the ends, elongate and arcuate pitch line of a cone gear usable in a radial position of the companion element, vertical planes taken in the direction of length of the axes of the embryo cone gear and companion element presenting such planes as extending at right angles to each other.

20. An arcuate pitch cone gear as in claim 19 characterized in that the embryo arcuate pitch cone gear developed for service in radial position is usable to determine the length of the elongate and the radius of its arcuate pitch line of the gear when positioned with its axis parallel to such radial position.

21. An arcuate pitch cone gear as in claim 19 characterized in that the embryo arcuate pitch cone developed for service in the radial position is usable to determine the length of the elongate of the tooth or thread zone and the length of the radius of the arcuate pitch line of the gear when positioned to present an angularity of the axis planes other than that of a right angle.

FRANK V. ELBERTZ.